United States Patent
Oda

(10) Patent No.: US 10,963,115 B2
(45) Date of Patent: Mar. 30, 2021

(54) POSITION INDICATOR AND WRITING INFORMATION PROCESSING APPARATUS

(71) Applicant: Wacom Co., Ltd., Saitama (JP)

(72) Inventor: Yasuo Oda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/557,807

(22) Filed: Aug. 30, 2019

(65) Prior Publication Data

US 2019/0384425 A1 Dec. 19, 2019

Related U.S. Application Data

(63) Continuation of application No. PCT/JP2017/034403, filed on Sep. 25, 2017.

(30) Foreign Application Priority Data

Mar. 3, 2017 (JP) .............................. JP2017-040084

(51) Int. Cl.
| | |
|---|---|
| *G06F 3/03* | (2006.01) |
| *G06F 3/044* | (2006.01) |
| *G06F 3/0354* | (2013.01) |
| *G06F 3/038* | (2013.01) |
| *G06F 3/046* | (2006.01) |

(52) U.S. Cl.
CPC .......... *G06F 3/0446* (2019.05); *G06F 3/0383* (2013.01); *G06F 3/03546* (2013.01); *G06F 3/046* (2013.01)

(58) Field of Classification Search
CPC ..................................................... G06F 3/0354
See application file for complete search history.

(56) References Cited

U.S. PATENT DOCUMENTS

| | | | | |
|---|---|---|---|---|
| 5,528,002 A | * | 6/1996 | Katabami | ............... G06F 3/044 178/19.06 |
| 10,073,558 B2 | * | 9/2018 | Kobori | .................... G06F 3/044 |

(Continued)

FOREIGN PATENT DOCUMENTS

| | | |
|---|---|---|
| JP | 8-69350 A | 3/1996 |
| JP | 2006-107124 A | 4/2006 |

(Continued)

*Primary Examiner* — Joseph R Haley
(74) *Attorney, Agent, or Firm* — Seed IP Law Group LLP

(57) ABSTRACT

A position indicator can visibly form handwriting, and can erase the handwriting and simultaneously erase corresponding electronic data. The position indicator includes a casing including a first indicating portion and a second indicating portion. The first indicating portion includes a core body capable of visually forming handwriting corresponding to a writing operation of the position indicator, and a first circuit element that enables a position indicated on a sensor surface to be detected by a sensor. The second indicating portion includes an erasing member that projects from the casing, which visually erases the handwriting formed by the core body, and a second circuit element that enables a position indicated on the sensor surface to be detected by the sensor. The second indicating portion includes a holder that holds the erasing member with respect to the casing, and the holder includes a member that contributes to an interaction with the sensor.

13 Claims, 13 Drawing Sheets

(56) References Cited

U.S. PATENT DOCUMENTS

2017/0277284 A1\* 9/2017 Kim ................ G06F 3/0383
2019/0227644 A1\* 7/2019 Nakayama .......... G06F 3/04883

FOREIGN PATENT DOCUMENTS

| JP | 2007-249670 A | 9/2007 | |
|---|---|---|---|
| JP | 2011-186803 A | 9/2011 | |
| JP | 5250306 B2 | 7/2013 | |
| JP | 2013-161307 A | 8/2013 | |
| JP | 5275283 B2 | 8/2013 | |
| JP | 2016-184444 A | 10/2016 | |
| JP | 2016-212737 A | 12/2016 | |
| JP | WO2016/006272 A1 | 4/2017 | |
| WO | WO-2016006272 A1 \* | 1/2016 | ........... G06F 3/0416 |
| WO | 2016/084424 A1 | 6/2016 | |
| WO | 2016/129614 A1 | 8/2016 | |

\* cited by examiner

FIG. 7
(A)
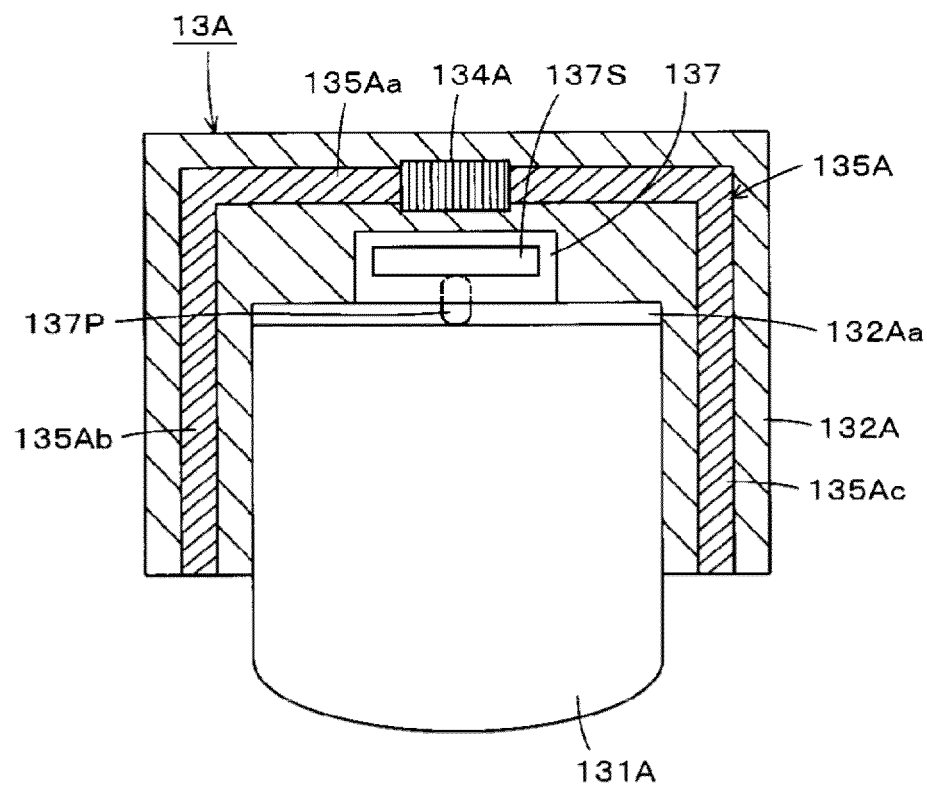
(B)
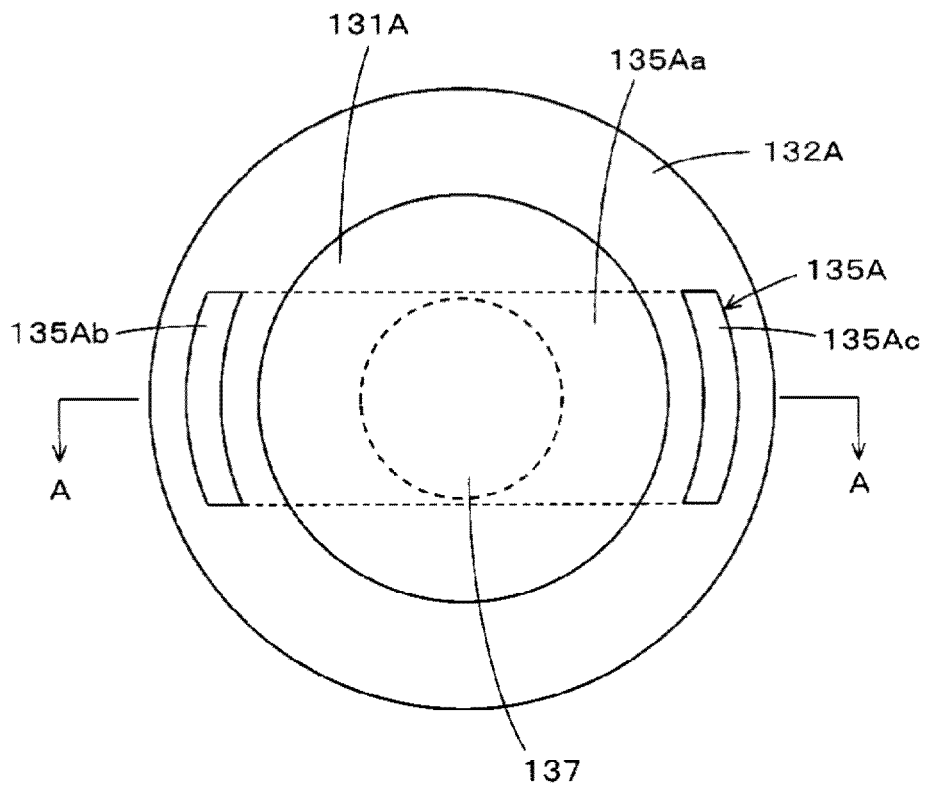

FIG. 8
(A)
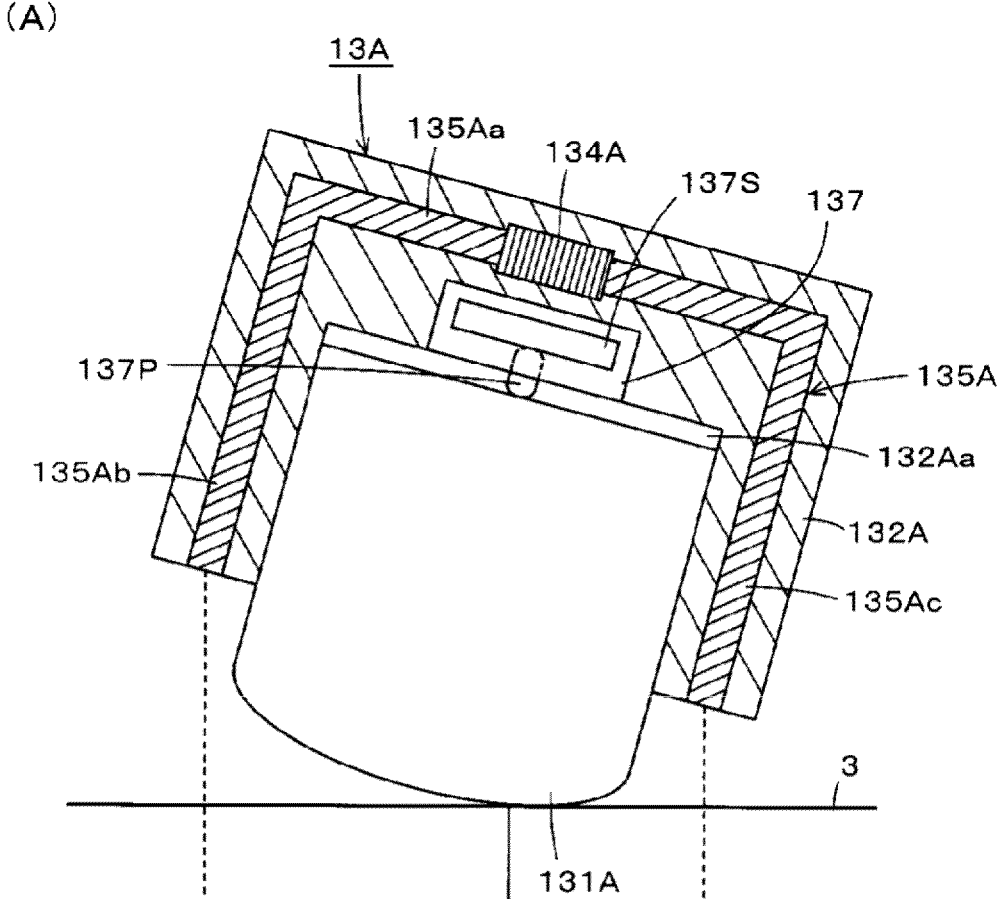
(B)
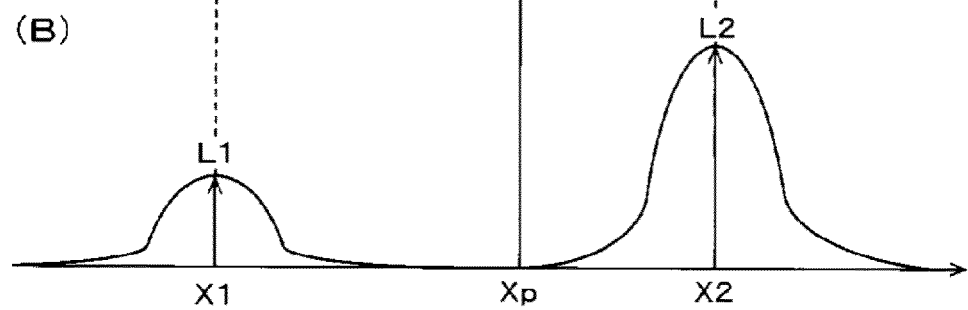

FIG.13

| IDENTIFICATION INFORMATION | WRITING INSTRUMENT FUNCTION | HANDWRITING FLAG PF | RECORDING ABILITY RC |
|---|---|---|---|
| ID1 | MECHANICAL PENCIL | 0 | 1 |
| ID2 | ERASABLE PEN | 1 | 1 |
| ID3 | FOUNTAIN PEN | 0 | 2 |
| ID4 | ORDINARY BALL-POINT PEN | 1 | 2 |

FIG.14

| IDENTIFICATION INFORMATION | ERASING MEMBER | ERASING ABILITY ER |
|---|---|---|
| IDa | ORDINARY ERASER | 0 |
| IDb | SAND ERASER | 1 |

FIG.15

STORAGE DATA FORMAT

| PAPER ID | HANDWRITING FLAG | RECORDING ABILITY | DISPLAY FLAG | COORDINATE DATA |
|---|---|---|---|---|

POSITION INDICATOR AND WRITING INFORMATION PROCESSING APPARATUS

TECHNICAL FIELD

The present disclosure relates to a position indicator functioning as a writing instrument whose writing can visually be confirmed and capable of indicating a position to a position detection sensor, and a writing information processing apparatus for use with such a position indicator.

BACKGROUND ART

To meet demands for paperless environments, it has become increasingly common to use, rather than writing instruments such as ball-point pens and pencils for handwriting something on a sheet of paper, a position indicator such as an electronic pen to enter handwriting into an input device such as a tablet terminal having a position detector that includes a sensor for detecting a position indicated by the position indicator, so that handwritten information entered using the position indicator can be stored as electronic data.

However, there are various situations requiring handwriting on sheets of paper, accompanied still by many demands for saving such handwritten sheets of paper.

In view of such requirements and demands, there has heretofore been proposed an input device arranged such that when something is handwritten on a sheet of paper placed on an input surface of a position detector including a sensor, using a position indicator that functions as a writing instrument, such as a ball-point pen or a pencil, whose writing can visually be confirmed, the handwritten writing information can be detected by the position detector and stored as electronic data.

For example, Patent Document 1 (Japanese Patent Laid-Open No. 2006-107124) discloses that a manuscript is produced by word processing software, and when the manuscript is printed on a sheet of paper, image data of the printed manuscript are stored in a storage unit of a tablet. When something is additionally written by a writing instrument on the printed manuscript that is placed on a coordinate input unit of the tablet for entering coordinate data, the coordinate input unit of the tablet detects corresponding electronic handwriting, i.e., coordinate data, and stores the detected coordinate data in the storage unit. According to Patent Document 1, therefore, it is possible to obtain an electronic document similar to the printed manuscript with the added handwriting by combining the coordinate data and the image data of the printed manuscript that are stored in the storage unit.

When writing information handwritten on a sheet of paper, which is also stored as electronic data, is erased, it is necessary that the corresponding electronic data be erased. Heretofore, it has been customary to use a rubber eraser to visibly erase writing information that is handwritten on a sheet of paper by a mechanical pencil, and to use a dedicated rubber eraser to visibly erase writing information that is handwritten on a sheet of paper by a handwriting-erasable ball-point pen by rubbing the area to be erased with the dedicated rubber eraser.

The electronic data are electrically erased by indicating the position where the writing information has been erased from the sheet of paper, with an eraser of a position indicator disclosed in Patent Document 2 (Japanese Patent Laid-Open No. 2007-249670), for example. The position indicator disclosed in Patent Document 2 includes a pen point made of a resin material, for example, and a first position indicating coil that are disposed in one end side of a tubular casing, i.e., a pen point side, and an eraser made of a resin material, as with the pen point, and a second position indicating coil that are disposed in a rear end side of the tubular casing opposite to the pen point side. A signal sent from the first position indicating coil to a tablet that serves as a position detecting device and a signal sent from the second position indicating coil to the tablet have different patterns.

The position detecting device monitors signals from the position indicator disclosed in Patent Document 2. When the position detecting device receives a signal from the first position indicating coil, the position detecting device detects the position indicated thereby as a writing input position, and when the position detecting device receives a signal from the second position indicating coil, the position detecting device detects the position indicated thereby as an erasure instruction input position.

Consequently, the electronic data corresponding to the visibly erased writing information can be erased by pointing the eraser of the position indicator disclosed in Patent Document 2 at a position which is the same as the position where the writing information has been visibly erased from the sheet of paper by rubbing the sheet of paper with the rubber eraser or the dedicated rubber eraser.

Patent Document 3 (Japanese Patent No. 5250306) discloses a distal pen data processing apparatus that uses a dedicated sheet of paper (Anoto paper) for recording handwritten information and also uses a writing digital pen and an erasing digital pen, in which, when writing information handwritten on the dedicated sheet of paper, the distal pen data processing apparatus can erase electronic data corresponding to the writing information.

PRIOR ART DOCUMENT

Patent Documents

Patent Document 1: Japanese Patent Laid-Open No. 2006-107124

Patent Document 2: Japanese Patent Laid-Open No. 2007-249670

Patent Document 3: Japanese Patent No. 5250306

BRIEF SUMMARY

Technical Problems

Heretofore, as described above, when something is handwritten on a sheet of paper, electronic data corresponding to the handwriting can simultaneously be saved by using a position indicator that functions as a writing instrument whose writing can visually be confirmed. However, for visually erasing the handwritten information, it is necessary to visually erase the handwriting using a rubber eraser or a dedicated rubber eraser and also to separately erase the electronic data using an eraser as disclosed in Patent Document 2, a process which is troublesome and time-consuming. In addition, after the handwriting on the sheet of paper has visually been erased, an erasing process is needed to trace the erased handwriting with the eraser, possibly resulting in some electronic data remaining unerased.

Using the digital pen disclosed in Patent Document 3 has the merit of being able to erase handwriting on a sheet of paper and the corresponding electronic data by visually erasing the handwriting on the sheet of paper with the erasing digital pen. However, the distal pen data processing apparatus of Patent Document 3 lacks versatility because it has to use a digital pen having a special structure incorporating a camera and a dedicated sheet of Anoto paper for use with the digital pen.

In view of the foregoing problems, it is an object of the present disclosure to provide a position indicator and a writing information processing apparatus which, when visible handwriting on a sheet of paper is visually erased, can simultaneously and well erase corresponding electronic data without using a digital pen and a dedicated sheet of paper as disclosed in Patent Document 3.

Technical Solution

In order to solve the above problems, there is provided in accordance to the disclosure recited in claim 1 a position indicator that indicates a plurality of positions on a sensor surface of a sensor by a plurality of interactions with the sensor. The position indicator includes a pen-shaped casing that includes, in respective axial ends thereof, a first indicating portion and a second indicating portion, and an interaction circuit which, in operation, causes the plurality of interactions between the sensor and the position indicator. The first indicating portion includes a core body that projects axially from the casing, the core body, in operation, visibly forming handwriting in response to a writing operation of the position indicator, and a first circuit element of the interaction circuit which, in operation, enables a first position indicated on the sensor surface by the first indicating portion to be detected via a first interaction between the interaction circuit and the sensor. The second indicating portion includes an erasing member that projects axially from the casing, the erasing member, in operation, visually erasing the handwriting that is visibly formed by the core body included the first indicating portion, and a second circuit element of the interaction circuit which, in operation, enables a second position indicated on the sensor surface by the second indicating portion to be detected via a second interaction between the interaction circuit and the sensor. The erasing member is held by a holder that includes a member which, in operation, cooperates with the second circuit to cause the second interaction between the second circuit element and the sensor.

With the position indicator according to claim 1 set forth above, when the erasing member visible erases the handwriting formed by the core body of the first indicating portion, the second indicating portion moves on the sensor surface in a manner corresponding to the erasing operation.

Therefore, the sensor can detect the position to which the second indicating portion has moved on the sensor surface as an erasure instruction position for the data. Even though the erasing member projects axially from the casing in the second indicating portion, because the holder that holds the erasing member includes the member that cooperates with the second circuit element to cause the second interaction with the sensor, the second interaction with the sensor is well maintained even if the second indicating portion is spaced from the sensor surface of the surface by the erasing member.

Advantageous Effect

According to the present disclosure, even though the erasing member that visually erases the handwriting that is visibly formed by the core body of the first indicating portion is included in the second indicating portion, because the erasing member is held by the holder that cooperates with the second circuit element to cause the second interaction with the sensor, the position indicator can well maintain the second interaction between the second indicating portion and the position detection sensor by the holder regardless of the erasing member.

BRIEF DESCRIPTION OF DRAWINGS

FIG. 7 is a view illustrating another configurational example of the second indicating portion of the position indicator according to the first embodiment of the present disclosure.

FIG. 8 is a view that is explanatory of a position detecting method for a position detector, which corresponds to the other configurational example of the second indicating portion of the position indicator according to the first embodiment of the present disclosure.

FIG. 13 is a diagram that is explanatory of a position indicator according to another embodiment of the present disclosure.

FIG. 14 is a diagram that is explanatory of the position indicator according to the other embodiment of the present disclosure.

FIG. 15 is a diagram that is explanatory of the position indicator according to the other embodiment of the present disclosure.

MODES FOR CARRYING OUT THE DISCLOSURE

Position indicators according to some embodiments of the present disclosure together with a writing information processing apparatus according to an embodiment thereof will hereinafter be described below with reference to the drawings.

First Embodiment

Figure 1:
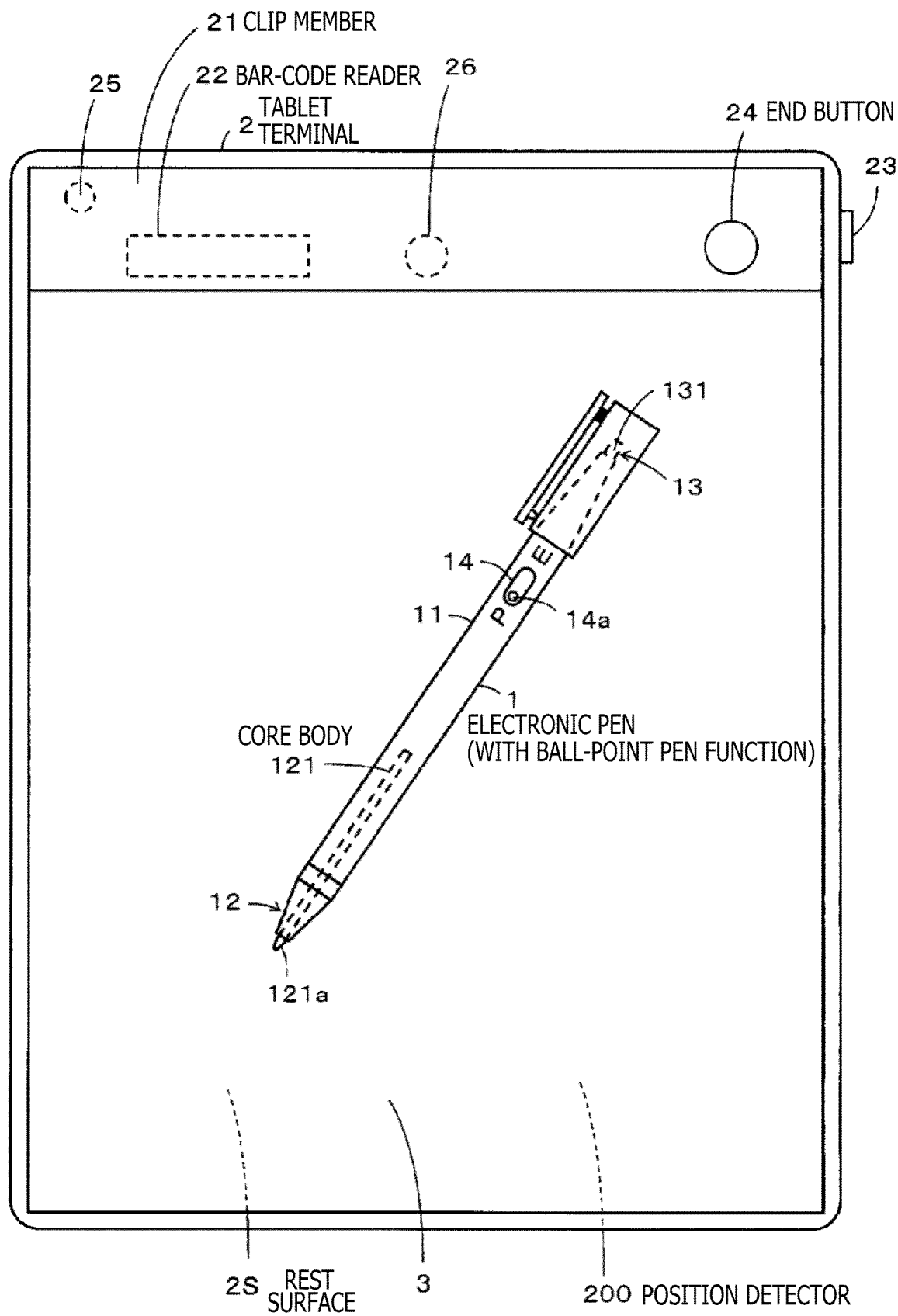
FIG. 1 is a view illustrating a configurational example of a writing information processing apparatus incorporating a position indicator according to a first embodiment of the present disclosure.

FIG. 1 is a view illustrating a configurational example of a handwriting information input apparatus incorporating a position indicator according to a first embodiment of the present disclosure. According to this configurational example, the handwriting information input apparatus includes a position indicator 1 and a tablet terminal 2 as an example of a writing information processing apparatus that includes a position detecting device. Although not depicted, according to this example, the tablet terminal 2 is connected via a network to a mobile terminal or a server through wireless communication means such as Bluetooth (registered trademark) or wireless fidelity (Wi-Fi) (registered trademark). The mobile terminal or the server performs signal processing based on handwriting information that has entered into the tablet terminal 2, and includes a storage unit for storing the handwriting information. The function of the mobile terminal may be incorporated in the tablet terminal 2. The tablet terminal 2 may not be connected to a mobile terminal, but may be connected to a personal computer installed at a fixed location.

Configurational examples of the tablet terminal 2 and the position indicator 1 will hereinafter be described below. For the sake of brevity, the position indicator will hereinafter be referred to as an electronic pen. The first embodiment to be described below refers to an example in which the electronic pen 1 and a sensor of a position detector of the tablet terminal 2 interact by way of an electromagnetic coupling such that the position detector detects a position indicated by the electronic pen 1.

As illustrated in FIG. 1, the tablet terminal 2 according to the present configurational example includes an instruction input surface where an instruction is input by the electronic pen 1, provided as a rest surface 2S for a sheet-like member such as a sheet of paper. According to the present example, the tablet terminal 2 includes a clip member 21 on an upper end portion of the rest surface 2S, for gripping and fixing a handwriting information input sheet 3 of paper as a sheet-like member to the rest surface 2S which is the instruction input surface of the tablet terminal 2. The tablet terminal 2 has an appearance similar to a widely used article of stationery called a clipboard or a binder and having a plate-like appearance and shape. According to the present example, a position detector 200 that uses an electromagnetic induction (electromagnetic coupling) is disposed in the tablet terminal 2 behind the rest surface 2S.

According to the present example, the handwriting information input sheet 3 of paper has a size corresponding to the size of a position detecting area of a sensor of the position detector 200 of the tablet terminal 2. According to the present example, the handwriting information input sheet 3 of paper has an A4 size. According to the present example, identification information (hereinafter referred to as paper identification (ID)) for identifying the handwriting information input sheet 3 of paper is printed on an upper end of the handwriting information input sheet 3 of paper. According to the present example, a bar code is printed as the paper ID. However, the paper ID is not necessarily limited to a bar code.

The tablet terminal 2 according to the present embodiment includes a power supply button 23. The tablet terminal 2 includes a chargeable battery, not depicted, that supplies a drive voltage to activate the tablet terminal 2 when the power supply button 23 is turned on.

The clip member 21 of the tablet terminal 2 includes a plate-like component and a spring member, not illustrated. The plate-like component has an end button 24 and a beep speaker 25 disposed thereon. The beep speaker 25 serves to indicate various states to the user with beep sounds.

A bar-code reader 22 as an example of reader for reading the paper ID is disposed on a surface of the plate-like component of the clip member 21 that faces the handwriting information input sheet 3 of paper on the rest surface 2S. A sheet mount sensor 26 for detecting whether or not the handwriting information input sheet 3 of paper is gripped and locked by the clip member 21 is disposed on a portion of the tablet terminal 2 where the plate-like component of the clip member 21 is positioned.

The sheet mount sensor 26 optically detects whether or not the handwriting information input sheet 3 of paper is mounted. According to the present example, the sheet mount sensor 26 includes a light source and a light detector, one of which is disposed on the rest surface 2S and the other on the clip member 21. The sheet mount sensor 26 detects when the handwriting information input sheet 3 of paper is mounted on the rest surface 2S based on whether or not the space between the light source and the light detector is interrupted by the sheet of paper.

According to the present embodiment, the clip member 21 of the tablet terminal 2 is arranged to hold and lock the handwriting information input sheet 3 of paper in covering relation to an area including the portion of the upper end thereof where the bar code is formed. When the handwriting information input sheet 3 of paper is placed in a predetermined position on the rest surface 2S and locked by the clip member 21, the bar-code reader 22 faces the position of the bar code printed on the handwriting information input sheet 3 of paper.

As illustrated in FIG. 1, the electronic pen 1 according to the first embodiment includes an electronic pen function portion 12 as an example of a first indicating portion on an axial end of a tubular casing 11 and an electronic eraser function portion 13 as an example of a second indicating portion on the other axial end of the casing 11. The electronic pen function portion 12 and the electronic eraser function portion 13 of the electronic pen 1 according to the first embodiment are arranged to perform an interaction by way of an electromagnetic coupling with the sensor of the position detector 200 of the tablet terminal 2. The position detector 200 of the tablet terminal 2 is arranged to detect a position indicated on the sensor by the electronic pen function portion 12 or the electronic eraser function portion 13.

The electronic pen 1 according to the present embodiment includes a switch 14 for switching between the electronic pen function portion 12 and the electronic eraser function portion 13. According to the present example, the switch 14 is constructed as a slide switch. In FIG. 1, when a slide operator 14a switches to a mark P, the electronic pen function portion 12 of the electronic pen 1 operates, and when the slide operator 14a switches to a mark E, the electronic eraser function portion 13 of the electronic pen 1 operates.

The electronic pen function portion 12 of the electronic pen 1 has a function to send a position detection signal via an electromagnetic coupling to the position detector 200 and also to visibly write handwriting on the handwriting information input sheet 3 of paper locked on the rest surface of the tablet terminal 2 in similar manner to visible writing using a ball-point pen or a pencil, which may be a mechanical pencil. According to the present example, the electronic pen function portion 12 includes a core body 121 that is of similar structure to a ball-point pen refill, and hence can write something visibly on the handwriting information input sheet 3 of paper in the same manner as writing with a ball-point pen. According to the present example, the core body 121 is filled with a friction ink that can be made colorless depending on a temperature change, so that writing information on the handwriting information input sheet 3 of paper can be erased.

The electronic eraser function portion 13 includes an erasing member 131 as a member for visually erasing handwriting formed by the core body 121 of the electronic pen function portion 12, and has a function to send an erasure instruction signal to the position detector 200 through an interaction by way of an electromagnetic coupling. According to the present example, the erasing member 131 is a member for visually erasing writing information formed on the handwriting information input sheet 3 of paper by the ball-point pen function of the core body 121 by making the writing information colorless with frictional heat generated by rubbing the handwriting information input sheet 3 of paper.

Therefore, the user of the electronic pen 1 switches the slide operator 14a of the switch 14 to the mark P when the user wants to visually write something on the handwriting information input sheet 3 of paper with the ball-point pen function of the electronic pen 1. Then, the user visibly writes letters or symbols and draws pictures on the handwriting information input sheet 3 of paper locked on the tablet terminal 2 by the clip member 21, using the ball-point pen function of the electronic pen function portion 12 of the electronic pen 1. At this time, the electronic pen function portion 12 of the electronic pen 1 simultaneously sends a position detection signal to the position detector 200. The position detector 200 receives the position detection signal and detects an indicated position corresponding to the handwriting formed on the handwriting information input sheet 3 of paper.

The tablet terminal 2 sends coordinate data of the indicated position by the electronic pen 1 that is detected by the position detector 200 as electronic data of the handwriting, together with the added paper ID of the handwriting information input sheet 3 of paper read by the bar-code reader 22, to the mobile terminal or the server. According to the present example, the tablet terminal 2 sends the data and the paper ID via a wireless link to the mobile terminal, and includes a control circuit and a wireless communication unit for such wireless transmission. The tablet terminal 2 according to the present embodiment has a buffer memory (temporary storage unit) for sending electronic data to the mobile terminal.

Therefore, the handwriting information input apparatus according to the present example is capable of acquiring information written on the handwriting information input sheet 3 of paper in real time as coordinate data as electronic data (writing data), without separately taking the trouble of reading information written on the handwriting information input sheet 3 of paper as electronic data with an image reader or the like.

If the tablet terminal 2 also has the function of a mobile terminal, then writing data detected by the position detector 200 are stored in its built-in storage unit.

When the user of the electronic pen 1 wants to erase visible handwriting or a drawn image on the handwriting information input sheet 3 of paper, the user switches the slide operator 14a of the switch 14 to the mark E. Then, the user rubs the handwriting or the drawn image on the handwriting information input sheet 3 of paper with the erasing member 131 of the electronic eraser function portion 13 of the electronic pen 1, visually erasing the handwriting or the drawn image. At this time, the electronic eraser function portion 13 simultaneously sends an erasure instruction signal to the position detector 200.

When the position detector 200 receives the erasure instruction signal from the electronic eraser function portion 13 through an interaction by way of an electromagnetic coupling between the electronic eraser function portion 13 of the electronic pen 1 and the sensor of the position detector 200, the position detector 200 detects an erasure instruction position represented by the erasure instruction signal received from the electronic eraser function portion 13.

The tablet terminal 2 then associates the coordinate data of the erasure instruction position detected by the position detector 200 with erasure identification information for identifying the indicated position indicated by the electronic pen function portion 12 and the indicated position indicated by the electronic eraser function portion 13, e.g., erasure information with additional information such as an erasure flag added thereto. The coordinate data of the erasure instruction position and the erasure information are sent together with the paper ID of the handwriting information input sheet 3 of paper read by the bar-code reader 22 to the mobile terminal or the server.

Coordinate information of handwriting (handwriting information) depending on the indicated position indicated by the electronic pen function portion 12 may be distinguished from the erasure information by identification information for handwriting added thereto, or pieces of identification information that are different from each other may be added to the erasure information and the handwriting information.

When the mobile terminal, for example, connected to the tablet 2 via the network receives the writing information with the added erasure information, with which the paper ID is associated, from the tablet terminal 2, the mobile terminal performs a real-time related process (real-time collaboration process) to perform an erasing process, corresponding to the erasure instruction position indicated by the writing information with the erasure information added thereto, for visually erasing the writing information that is stored in association with the paper ID.

If the tablet terminal 2 has the function of a mobile terminal, then the tablet terminal 2 performs a similar erasing process on the writing information stored in its storage unit.

As described above, when the handwriting or the drawn image is visibly erased from the handwriting information input sheet 3 of paper by the erasing member 131 of the electronic eraser function portion 13, the writing information stored in association of the paper ID of the electronic eraser function portion 13 is also automatically erased depending on the erasing process.

[Configurational Example of the Electronic Pen Function Portion 12 of the Electronic Pen 1]

Figure 2:
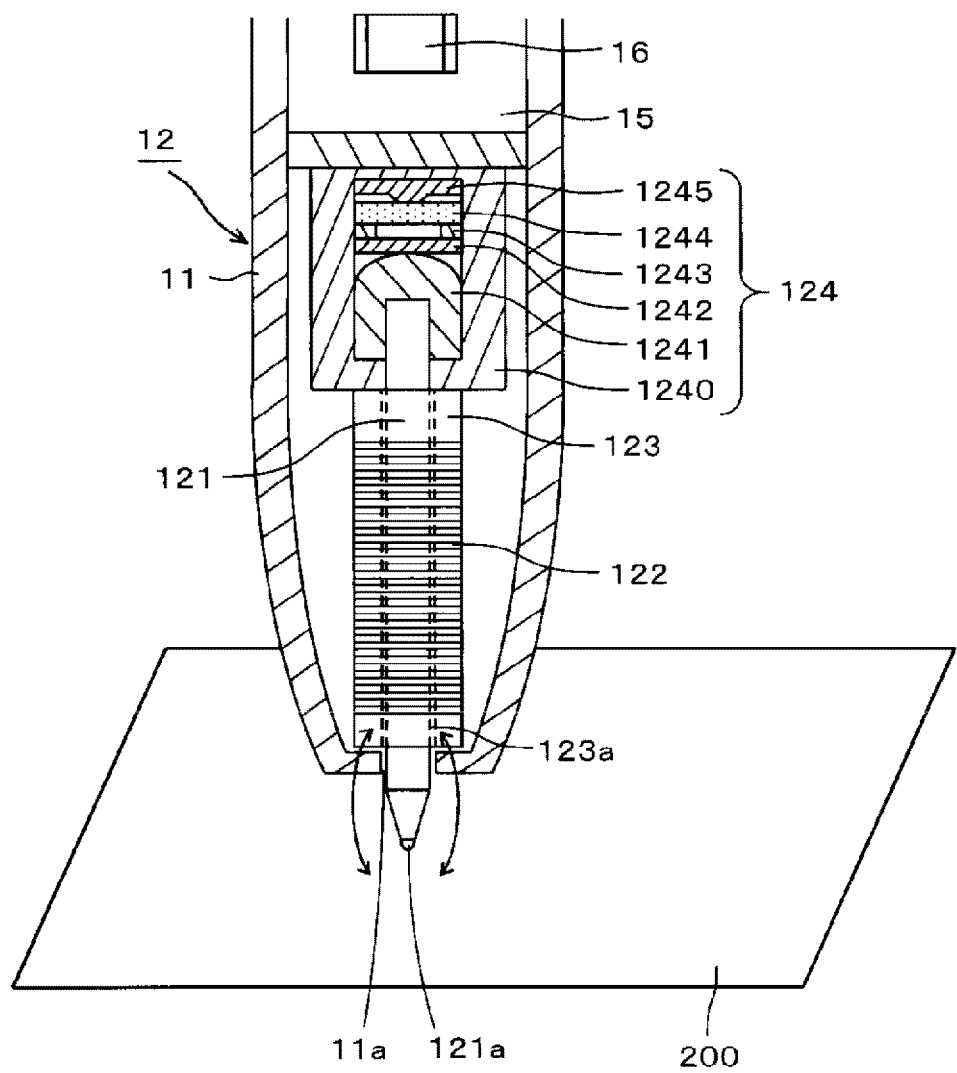
FIG. 2 is a view illustrating a configurational example of a first indicating portion of the position indicator according to the first embodiment of the present disclosure.

FIG. 2 is a view illustrating a configurational example of the electronic pen function portion 12 of the electronic pen 1 according to the present embodiment. As illustrated in FIG. 2, the casing 11 of the electronic pen 1 houses a magnetic core with a coil 122 wound thereon, i.e., a ferrite core 123 in this example, therein near a pen point thereof.

The ferrite core 123 includes a cylindrical member of ferrite, for example, with a through hole 123a of a predetermined diameter defined axially through for insertion therethrough of the core body 121 that has a function as a writing instrument capable of visibly writing something on a sheet-like member, for example. The core body 121 is longer than the axial length of the ferrite core 123. The core body 121 that is inserted through the through hole 123a in the ferrite core 123 has a diameter slightly smaller than the diameter of the through hole so as to be axially movable in the through hole 123a in the ferrite core 123.

The core body 121 has a distal end portion 121a serving as a pen point projecting out of an opening 11a defined in the end of the casing 11. The core body 121 visibly writes something on the sheet-like member with the distal end portion 121a.

The coil 122 wound on the ferrite core 123 has start-of-coil and end-of-coil ends from which extend leads, not depicted, in the cavity in the casing 11 to a printed-circuit board 15 where the leads are connected to a capacitor 16 as a capacitive element on the printed-circuit board 15. The coil 122 as an inductive element and the capacitor 16 on the printed-circuit board 15 jointly make up a resonant circuit, providing an interaction circuit for sending and receiving signals between the resonant circuit and the position detector 200 of the tablet terminal 2 via an interaction by way of an electromagnetic coupling, as schematically indicated by the arrows in FIG. 2. According to the present example, therefore, the electronic pen function portion 12 includes the interaction circuit for performing an interaction by way of an electromagnetic coupling with the position detector 200 of the tablet terminal 2, including the resonant circuit made up of the coil 122 as the inductive element and the capacitor 16 as the capacitive element. The resonant circuit sends a position detection signal to the position detector 200. The ferrite core 123 is a first circuit element of the interaction circuit.

In the cavity in the casing 11, a pen pressure detector 124 is disposed on the side of the ferrite core 123 with the coil 122 wound thereon remotely from the pen point. The pen pressure detector 124 is held in position by a molded member 1240.

As illustrated in FIG. 2, the molded member 1240 houses therein a core body holder 1241, an electrically conductive rubber pad 1242, a ring spacer 1243, a dielectric body 1244, and a terminal member 1245. These parts are held in the molded member 1240, making up the pen pressure detector 124 for detecting a pen pressure.

The core body holder 1241 is in the form of a cup made of hard rubber or the like, for example. The core body 121 has an end portion remote from the pen point, removably inserted and held in the core body holder 1241. The core body holder 1241 functions as a presser for pressing the electrically conductive rubber pad 1242 toward the dielectric body 1244 with the ring spacer 1243 interposed therebetween, depending on a pen pressure applied to the core body 121.

The terminal member 1245 which has a predetermined area is disposed on a surface of the dielectric body 1244 remote from the electrically conductive rubber pad 1242. The electrically conductive rubber pad (first electrode) 1242 and the terminal member (second electrode) 1245 face each other across the dielectric body 1244, making up a variable-capacitance capacitor. A voltage applied to the core body 121 is detected as a change in the capacitance of the variable-capacitance capacitor.

According to the present embodiment, the variable-capacitance capacitor of the pen pressure detector 124 as well as the capacitor 16 is connected parallel to the coil 122, serving as part of the resonant circuit. The position detecting device detects a pen pressure applied to the core body 121 of the electronic pen function portion 12 of the electronic pen 1 by detecting the frequency of the resonant circuit that changes depending on a change in the capacitance of the variable-capacitance capacitor.

In the present example, the pen pressure detector 124 that is made up of the core body holder 1241, the electrically conductive rubber pad 1242, the ring spacer 1243, the dielectric body 1244, and the terminal member 1245 is similar to pen pressure detecting means having a known structure disclosed in Patent Document: Japanese Patent Laid-Open No. Hei 5-275283, for example. Alternatively, the pen pressure detector 124 may be constructed in similar fashion to pen pressure detecting means having a known structure disclosed in Japanese Patent Laid-Open No. 2011-186803. Further alternatively, the pen pressure detector 124 may be constructed using a semiconductor device whose capacitance is variable depending on a pen pressure, as disclosed in Japanese Patent Laid-Open No. 2013-161307.

Pen pressure information detected by the pen pressure detector 124 is used in association with the thickness of writing, for example, in the mobile terminal.

[Configurational Example of the Electronic Eraser Function Portion 13 of the Electronic Pen 1]

Figure 3:
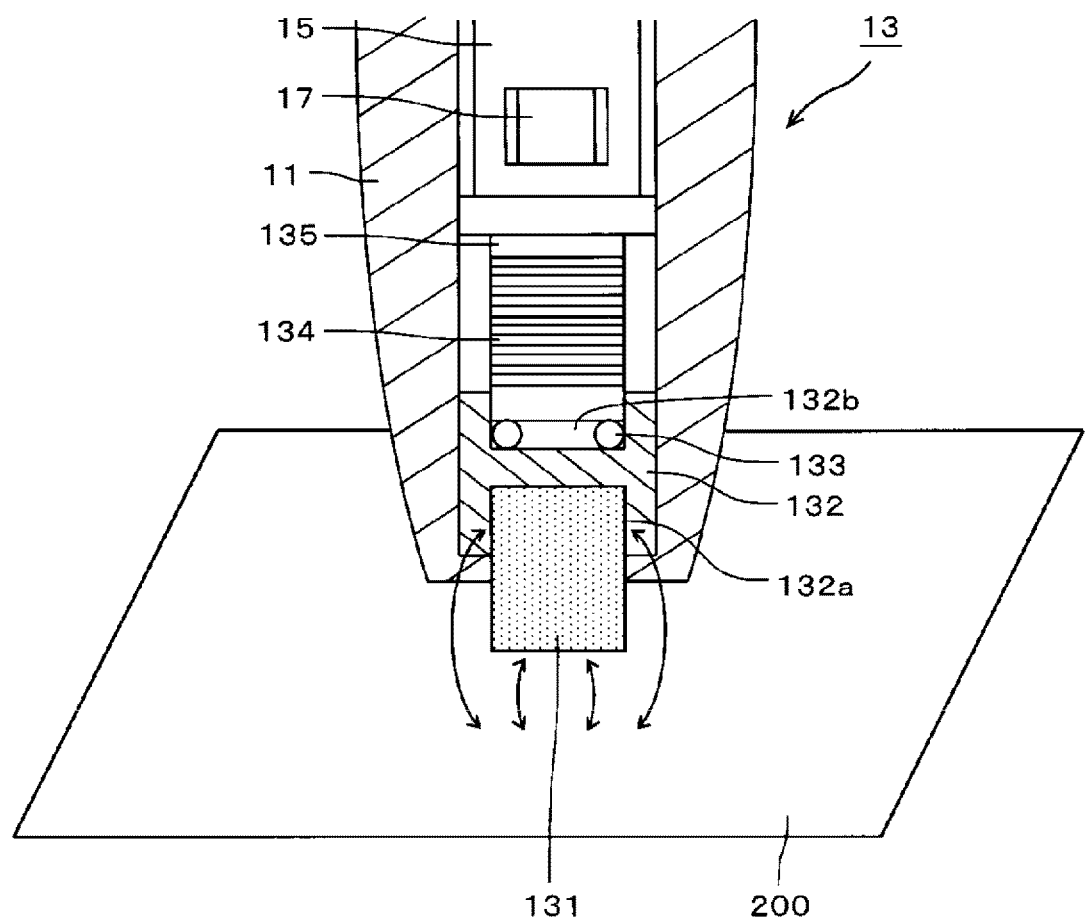
FIG. 3 is a view illustrating a configurational example of a second indicating portion of the position indicator according to the first embodiment of the present disclosure.

FIG. 3 is a view illustrating a configurational example of the electronic eraser function portion 13 of the electronic pen 1 according to the present embodiment. As illustrated in FIG. 3, the erasing member 131 for visually erasing handwriting formed on the handwriting information input sheet 3 of paper is housed in a rubber eraser case 132 as an example of holder of the erasing member 131 in a rear end of the casing 11 of the electronic pen 1 remote from the pen point.

The erasing member 131 is made of rubber for visually erasing handwriting by making handwriting colorless by rubbing the handwriting formed of friction ink on the sheet of paper, as described above.

The rubber eraser case 132 as the holder of the erasing member 131 has an appearance having a cylindrical shape, and is made of a magnetic material such as ferrite or the like that contributes to an interaction by way of an electromagnetic coupling with the position detector 200. The rubber eraser case 132 has a recess 132a defined in one side of the cylinder along a center line direction for housing a portion of the erasing member 131 fitted therein. The erasing member 131 is arranged to be fitted in the recess 131a in the rubber eraser case 132 against easy removal therefrom. Since the rubber eraser case 132 is made of a magnetic material such as ferrite or the like, it can well maintain an interaction by way of an electromagnetic coupling with the position detector 200.

According to the present embodiment, furthermore, a magnetic powder is mixed with the erasing member 131 to cause the erasing member 131 itself to function as a magnetic member for better maintaining the interaction with the position detector 200.

The rubber eraser case 132 also has a recess 132b defined in the other side of the cylinder along a center line direction. The recess 132b receives an elastic O-ring 133 disposed therein, and a magnetic core, i.e., a cylindrical ferrite core 135 in this example, has an end portion inserted in the recess 132b and having an end face abutting against the O-ring 133. The outside diameter of the recess 132b is larger than the outside diameter of the ferrite core 135, so that the ferrite core 135 is displaceable in the center line directions, i.e., axial directions, in the recess 132b in the rubber eraser case 132.

A coil 134 is wound on the ferrite core 135. The coil 134 would on the ferrite core 135 has start-of-coil and end-of-coil ends from which extend leads, not depicted, in the cavity in the casing 11 to the printed-circuit board 15 where the leads are connected to a capacitor 17 on the printed-circuit board 15. A resonant circuit that is made up of the coil 134 as an inductive element and the capacitor 17 as a capacitive element on the printed-circuit board 15 also serves as part of the interaction circuit for an interaction by way of an electromagnetic coupling with the position detector 200 of the tablet terminal 2. The resonant circuit sends a position detection signal, i.e., an erasure instruction signal, to the position detector 200. The resonant circuit and the position detector 200 can send and receive signals therebetween via an interaction by way of an electromagnetic coupling (see the arrows in FIG. 3).

According to the present example, the electronic eraser function portion 13 includes the interaction circuit for performing an interaction by way of an electromagnetic coupling with the position detector 200 of the tablet terminal 2, including the resonant circuit made up of the coil 134 and the capacitor 17. The resonant circuit sends an erasure instruction signal to the position detector 200. The ferrite core 135 is a second circuit element of the interaction circuit. According to the present example, the erasure instruction signal is generated by the resonant circuit including the coil 134, and is sent to the position detector 200 through a magnetic path formed by the ferrite core 135, the rubber eraser case 132 made of a magnetic material, and the erasing member 131 containing a magnetic material.

When the erasing member 131 of the electronic eraser function portion 13 is pressed and rubbed against the handwriting information input sheet 3 of paper, the rubber eraser case 132 is displaced toward the ferrite core 135 due to the elasticity of the O-ring 133 under the pressure (referred to as erasing pressure) applied to the distal end of the erasing member 131. Therefore, the inductance value of a structure that includes the coil 134, the ferrite core 135, and the rubber eraser case 132 made of a magnetic material is changed, changing the resonant frequency of the resonant circuit made up of the coil 134 and the capacitor 17.

The electronic eraser function portion 13 detects the erasing pressure applied to the erasing member 131 as a change in the inductance value. In other words, the rubber eraser case 132, the O-ring 133, and the ferrite core 135 with the coil 134 wound thereon make up an erasing pressure detector in which the inductance value is changed depending on the applied pressure, changing the resonant frequency.

According to the present embodiment, since the resonant frequency of the resonant circuit made up of the coil 134 and the capacitor 17 changes depending on the erasing pressure, the position detector 200 detects the change in the resonant frequency to detect the erasing pressure applied to the erasing member 131 of the electronic eraser function portion 13 of the electronic pen 1. The detected erasing pressure can be associated with the size of the area that is indicated as being erased, for example, on the mobile terminal.

According to the above example, the magnetic powder is mixed with the erasing member 131 to cause the erasing member 131 to function as a magnetic member. However, with the electronic pen 1 according to the first embodiment, the rubber eraser case 132 as the holder that holds the erasing member 131 should be made of a magnetic material as a magnetic path material making up the magnetic path for the coil 134 as well as the ferrite core 135, for well maintaining the interaction by way of the electromagnetic coupling with the position detector 200, and the erasing member 131 may not necessarily function as a magnetic member.

[Configurational Example of the Electronic Circuits of the Electronic Pen 1 and the Position Detector 200 of the Tablet Terminal 2]

Figure 4:
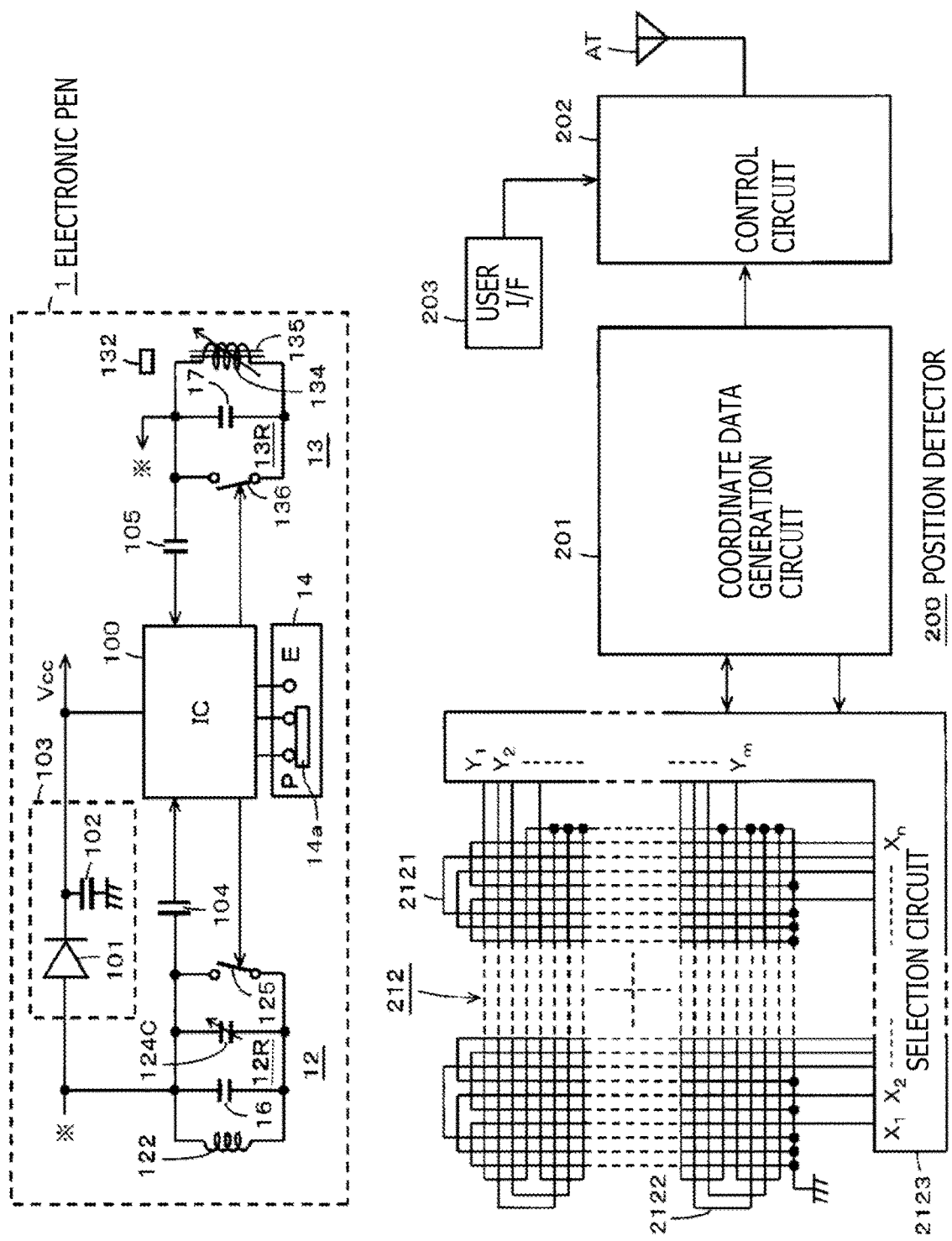
FIG. 4 is a diagram illustrating a configurational example of an electronic circuit of the position indicator according to the first embodiment of the present disclosure and an electronic circuit of a tablet terminal according to the example illustrated in FIG. 2.

FIG. 4 is a diagram illustrating an equivalent circuit of the electronic pen 1 according to the present embodiment and a configurational example of a circuit of the position detector 200 of the tablet terminal 2 for detecting a position and a pen pressure via an interaction by way of an electromagnetic coupling with the electronic pen function portion 12 of the electronic pen 1 and detecting an erasing position and an erasing pressure via an interaction by way of an electromagnetic coupling with the electronic eraser function portion 13 of the electronic pen 1.

The position detector 200 of the tablet terminal 2 according to the example illustrated in FIG. 4 includes a sensor 212, a coordinate data generation circuit 201, and a control circuit 202. The sensor 212 includes an X-axis direction loop coil group 2121 and a Y-axis direction loop coil group 2122 that are stacked one on the other, and a selection circuit 2123 for successively selecting one, at a time, of loop coils of the two loop coil groups 2121 and 2122.

The coordinate data generation circuit 201 of the position detector 200 is connected to the selection circuit 2123 and controls the selection circuit 2123 to select loop coils. The coordinate data generation circuit 201 includes a sending circuit for sending an alternate current (AC) signal having a predetermined frequency through a loop coil selected by the selection circuit 2123 and a receiving circuit for receiving a signal, which represents the AC signal that has returned, via a resonant circuit 12R or 13R, to be described later, of the electronic pen 1. The coordinate data generation circuit 201 performs sending and receiving operations in a time-division fashion. The receiving circuit of the coordinate data generation circuit 201 detects indicated position coordinates on the sensor 212 indicated by the electronic pen function portion 12 or the electronic eraser function portion 13 of the electronic pen 1 based on the reception level of a received signal from the loop coil selected by the selection circuit 2123. Furthermore, the coordinate data generation circuit 201 detects a pen pressure applied to the core body 121 and a pressure applied to the erasing member 131 from a signal from the electronic pen 1.

The coordinate data generation circuit 201 outputs the detected indicated position coordinates on the sensor 212 indicated by the electronic pen function portion 12 or the electronic eraser function portion 13 of the electronic pen 1, the detected pen pressure, and the detected pressure. Signals represented the output coordinates and pressures are supplied to the control circuit 202, which processes the supplied signals.

The control circuit 202 temporarily stores information of the indicated position indicated by the electronic pen function portion 12 or the electronic eraser function portion 13 of the electronic pen 1 and pen pressure information that have been received from the coordinate data generation circuit 201. The control circuit 202 then acquires a bar code read from the handwriting information input sheet 3 of paper by the bar-code reader 22 as a paper ID through a user interface (IF) 203, and stores information of the acquired paper ID in association with the temporarily stored information. In one or more embodiments, the control circuit 202 includes a processor (e.g., central processing unit (CPU)) and a memory storing instructions that, when executed by the processor, cause the processor to perform the functions of the control circuit 202 described herein.

Then, the control circuit 202 sends the information of the indicated position indicated by the electronic pen function portion 12 or the electronic eraser function portion 13 of the electronic pen 1, the information of the detected pressure (pen pressure), and the paper ID, from the wireless communication unit, not depicted, via a wireless link to the mobile terminal.

When the control circuit 202 detects when the handwriting information input sheet 3 of paper is placed on the rest surface 2S and locked thereon by the clip member 21 from a detection output of the sheet mount sensor 26, the control circuit 202 performs control operations to control the bar-code reader 22 to be activated and control the radiation of beep sounds from the beep speaker 25.

As illustrated in FIG. 4, the electronic pen 1 includes a signal control circuit constructed as an integrated circuit (IC) 100, and acquires signals sent from the loop coil groups 2121 and 2122 of the sensor 212 of the position detector 200 of the tablet terminal 2, as excitation signals to provide a drive voltage for driving the IC 100. Excitation coils may separately be disposed around the X-axis direction loop coil group 2121 and the Y-axis direction loop coil group 2122, and may supply excitation signals to the electronic pen 1.

In the electronic pen function portion 12 of the electronic pen 1, the capacitor 16 and the variable-capacitance capacitor, denoted by 124C, of the pen pressure detector 124 are connected parallel to the coil 122, making up the resonant circuit, denoted by 12R. As the capacitance of the variable-capacitance capacitor 124C changes depending on a pen pressure, the pen pressure information detected by the pen pressure detector 124 is transmitted as a change in the resonant frequency (phase) of the resonant circuit 12R to the position detector 200. The coordinate data generation circuit 201 of the position detector 200 detects pen pressure information from the change in the resonant frequency (phase) of the received signal.

A switch 125 is connected parallel to the resonant circuit 12R. The switch 125 is controlled so as to be turned on and off by the IC 100. When the switch 125 is turned off, the resonant circuit 12R resonates with a signal from the sensor 212 of the position detector 200. When the switch 125 is turned on, it establishes a short circuit across the capacitor 16 and the variable-capacitance capacitor 124C that are connected parallel to the coil 122, turning off the operation of the resonant circuit 12R to resonate with the signal from the sensor 212.

In the electronic eraser function portion 13 of the electronic pen 1, the capacitor 17 is connected parallel to the coil 134, making up the resonant circuit, denoted by 13R. The coil 134 wound on the ferrite core 135 serves as a variable-inductive element that is part of the erasing pressure detector.

The pressure information detected by the erasing pressure detector is transmitted as a change in the resonant frequency (phase) of the resonant circuit 13R to the position detector 200. The coordinate data generation circuit 201 of the position detector 200 detects pressure information from the change in the resonant frequency (phase) of the received signal.

A switch 136 is connected parallel to the resonant circuit 13R. The switch 136 is controlled so as to be turned on and off by the IC 100. When the switch 136 is turned off, the resonant circuit 13R resonates with a signal from the sensor 212 of the position detector 200. When the switch 136 is turned on, it establishes a short circuit across the capacitor 17 that is connected parallel to the coil 134, turning off the operation of the resonant circuit 13R to resonate with the signal from the sensor 212.

The IC 100 is arranged to operate at a power supply voltage Vcc that is produced when the AC signal received by the resonant circuit 12R or the resonant circuit 13R via the interaction by way of the electromagnetic coupling from the sensor 212 of the position detector 200 of the tablet terminal 2 is rectified by a rectifying circuit (power supply circuit) 103 made up of a diode 101 and a capacitor 102. The IC 100 is connected to the resonant circuit 12R and the resonant circuit 13R respectively through a capacitor 104 and a capacitor 105, and monitors operating states of the resonant circuits 12R and 13R. By monitoring the operating states of the resonant circuits 12R and 13R, the IC 100 detects the state of an electromagnetic coupling with the sensor 212 or a signal representing control data, not described in this example, sent from the sensor 212 of the position detector 200 using the two loop coil groups 2121 and 2122, and performs a desired operation control process.

The switch 14 is connected to the IC 100. When the slide operator 14a of the switch 14 switches to the mark P, the IC 100 controls the resonant circuit 12R to operate, and when the slide operator 14a switches to the mark E, the IC 100 controls the resonant circuit 13R to operate. Specifically, when the IC 100 controls the resonant circuit 12R to operate, the IC 100 keeps the switch 136 of the resonant circuit 13R on at all times, stopping a signal from the sensor 212 from returning from the resonant circuit 13R to the sensor 212, and controls the switch 125 of the resonant circuit 12R to be turned on and off to send a position detection signal in a first intermittent pattern to the position detector 200.

When the IC 100 controls the resonant circuit 13R to operate, the IC 100 keeps the switch 125 of the resonant circuit 12R on at all times, stopping a signal from the sensor 212 from returning from the resonant circuit 12R to the sensor 212, and controls the switch 136 of the resonant circuit 13R to be turned on and off to send an erasure instruction signal in a second intermittent pattern, which is different from the first intermittent pattern based on the on-and-off control of the switch 125 of the resonant circuit 12R, to the position detector 200. The first intermittent pattern and the second intermittent pattern may be made different from each other by altering the length of a continuous signal period of a burst signal or altering the length of an intermittent period of a burst signal, for example.

It is also possible for the position detector 200 to determine whether a received signal is a signal from the electronic pen function portion 12 or a signal from the electronic eraser function portion 13 by altering the frequency of a burst signal (altering the resonant frequencies of the resonant circuit 12R and the resonant circuit 13R). Furthermore, the signal level of a signal sent from the electronic pen function portion 12 of the electronic pen 1 and the level of a signal sent from the electronic eraser function portion 13 of the electronic pen 1 may be set to different levels, making it possible to determine an operation by the electronic pen function portion 12 or an operation by the electronic eraser function portion 13 based on the signal level of a signal received by the position detector 200.

[Example of the Processing Operation of the Tablet Terminal 2]

An example of processing operation of the tablet terminal 2 according to the present embodiment will be described below with reference to a flowchart illustrated in FIGS. 5 and 6. The processing operation to be described below will be described as a process all carried out by the control circuit 202 though it partly includes a process carried out by the coordinate data generation circuit 201.

When the tablet terminal 2 is switched on by the power supply button 23, the control circuit 202 determines whether or not the handwriting information input sheet 3 of paper has been placed on the rest surface 2S and locked and mounted thereon by the clip member 21 from a sensor output from the sheet mount sensor 26 (S201). If the control circuit 202 determines at S201 that the handwriting information input sheet 3 of paper has not been placed on the rest surface 2S, then the control circuit 202 determines whether or not a signal has been received from the electronic pen 1 (S202).

If the control circuit 202 determines at S202 whether a signal has not been received from the electronic pen 1, then the control circuit 202 makes processing return to S201, and repeats the process from S201. If the control circuit 202 determines at S202 that a signal has been received from the electronic pen 1, then since the handwriting information input sheet 3 of paper has not been placed, the control circuit 202 radiates a beep sound from the beep speaker 25, indicating an alarm (S203). Then, the control circuit 202 makes processing return to S201, and repeats the process from S201.

If the control circuit 202 determines at S201 that the handwriting information input sheet 3 of paper has been placed on the rest surface 2S, then the control circuit 202 reads bar-code information associated with the paper ID with the bar-code reader 22 (S204).

The control circuit 202 determines whether or not the bar code is unreadable (S205). If the control circuit 202 determines that the bar code is unreadable, then the control circuit 202 radiates a beep sound from the beep speaker 25, indicating an alarm (S206). Thereafter, the control circuit 202 makes processing return to S205. Upon the indication of the alarm based on the beep sound, the user takes measures to make the bar code readable as by mounting the handwriting information input sheet 3 of paper properly on the rest surface 2S.

If the control circuit 202 determines at S205 that the bar code is readable, then the control circuit 202 acquires bar-code information (paper ID) read by the bar-code reader 22, stores the acquired bar-code information, and sends the acquired bar-code information to the mobile terminal (S207).

Next, the control circuit 202 waits for a signal to be received from the electronic pen 1 (S208). If the control circuit 202 determines that it has received a signal from the electronic pen 1, it determines whether the received signal is a position detection signal for writing or an erasure instruction signal for erasure (S209). According to the present example, the coordinate data generation circuit 201 determines the received signal based on the intermittent pattern of the received signal at S209.

Figure 6:
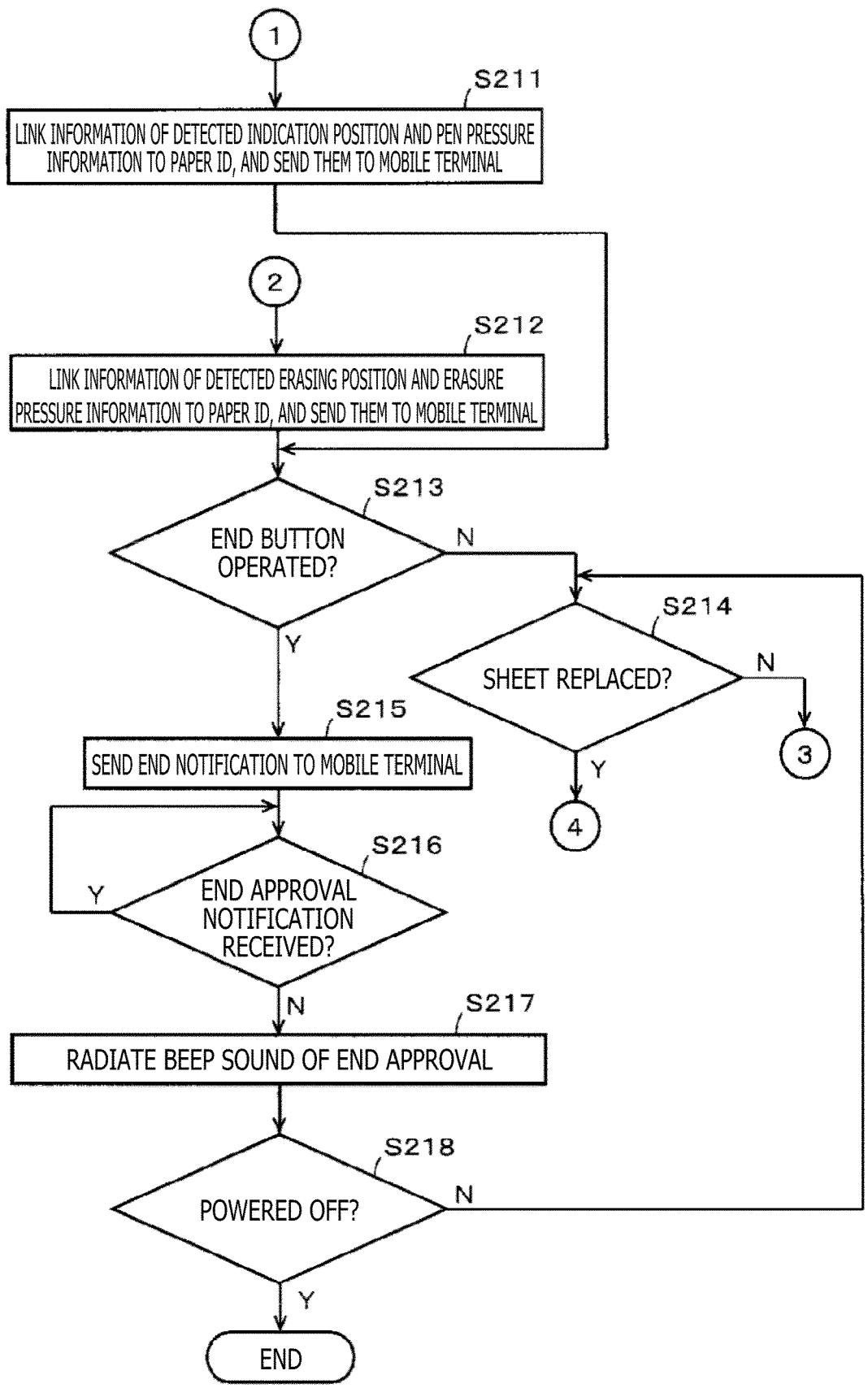
FIG. 6 is a diagram illustrating a portion of the flowchart that is explanatory of the example of operation of the writing information processing apparatus according to the embodiment of the present disclosure.

If the resonant frequency of the resonant circuit 12R and the resonant frequency of the resonant circuit 13R are distinguishable from each other, for example, and the control circuit 202 determines at S209 that the received signal is a position detection signal for writing from the resonant frequency of the received signal, then the control circuit 202 sends the coordinate information of a detected indicated position indicated by the electronic pen function portion 12 and pen pressure information, in association with the paper ID acquired at S207, to the mobile terminal (S211 in FIG. 6).

If the control circuit 202 determines at S209 that the received signal is an erasure instruction signal from the resonant frequency of the received signal, then the control circuit 202 sends the coordinate information of a detected indicated position (information of an erasing position) indicated by the electronic eraser function portion 13 and erasing pressure information, in association with the paper ID acquired at S207, to the mobile terminal (S212 in FIG. 6).

Following S211 and S212, the control circuit 202 determines whether or not the end button 24 has been operated (S213). If the control circuit 202 determines at S213 that the end button 24 has not been operated, the control circuit 202 determines whether or not the handwriting information input sheet 3 of paper has been replaced based on a sensor output from the sheet mount sensor 26. Specifically, when the handwriting information input sheet 3 of paper placed on the rest surface 2S is removed from the clip member 21 for replacement, the sheet mount sensor 26 is turned on as the light detector can detect light from the light emitter. Thereafter, when a handwriting information input sheet 3 of paper is placed on the rest surface 2S and locked thereon by the clip member 21, the sheet mount sensor 26 is turned off as light from the light detector cannot detect light from the light emitter, so that the replacement of the handwriting information input sheet 3 of paper is detected.

Figure 5:
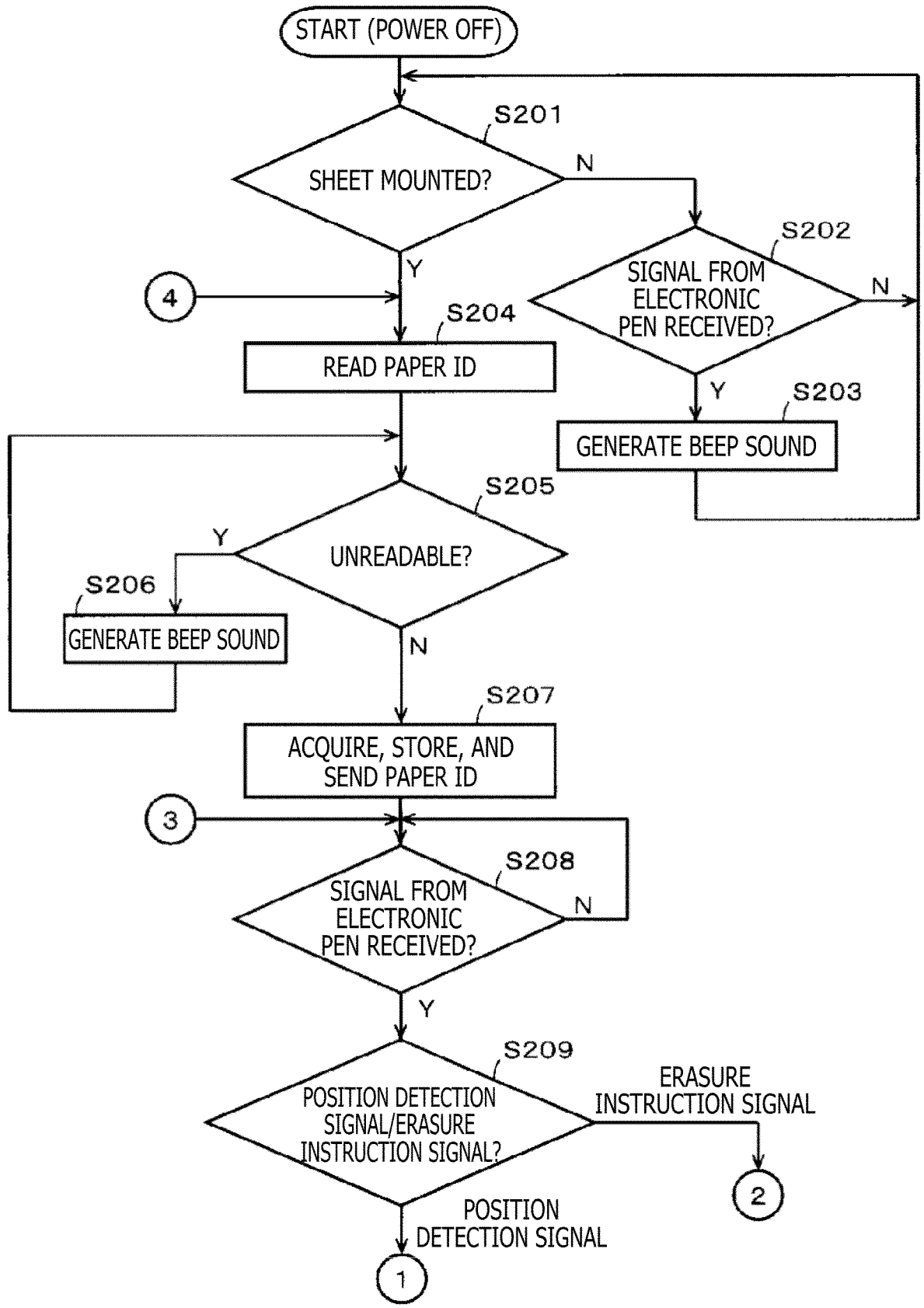
FIG. 5 is a diagram illustrating a portion of a flowchart that is explanatory of an example of operation of a writing information processing apparatus according to an embodiment of the present disclosure.

If the control circuit 202 determines that the sheet of paper has not been replaced at S214, then the control circuit 202 makes processing go to S208 illustrated in FIG. 5, and repeats the process of entering handwriting information and handwriting information erasure on the handwriting information input sheet 3 of paper with the electronic pen 1 from S208.

If the control circuit 202 determines that the sheet of paper has been replaced at S214, then the control circuit 202 makes processing go to S204 illustrated in FIG. 5, and repeats the process at the time the handwriting information input sheet 3 of paper is placed on the rest surface 2S from S204.

If the control circuit 202 determines that the end button 24 has been operated at S213, then the control circuit 202 recognizes that the process of entering handwriting information and handwriting information erasure on the handwriting information input sheet 3 of paper placed on the rest surface 2S, and sends an end notice to the mobile terminal (S215).

When the mobile terminal receives the end notice, the mobile terminal sends an end approval notification to the tablet terminal 2. The control circuit 202 waits for the end approval notification from the mobile terminal (S216).

If the control circuit 202 receives the end approval notification from the mobile terminal at S216, then the control circuit 202 radiates a beep sound indicating an end approval from the beep speaker 25 (S217). The beep sound of the end approval is different from beep sounds for other alarm indications. For example, if a beep sound for an alarm indication is a long beep, then the beep sound of the end approval is a succession of short beeps, so that the alarm and the end approval are indicated by the beep sounds that are distinguishable from each other.

Following S217, the control circuit 202 determines whether or not the power supply button 23 has been operated to turn off the power supply (S218). If the control circuit 202 determines that the power supply has not been turned off, then the control circuit 202 makes processing go to S214 and repeats the process from S214. If the control circuit 202 determines that the power supply has been turned off at S218, then the control circuit 202 finishes all the processing routine and turns off the power supply.

Advantages of the First Embodiment

As described above, the electronic pen 1 according to the present embodiment is able to visually erase the handwriting on the handwriting information input sheet 3 of paper and also to erase handwriting data recorded in association with the visually erased handwriting when the erasing member 131 is operated to rub the handwriting on the handwriting information input sheet 3 of paper.

Since the rubber eraser case 132 that houses therein the erasing member 131 for visually erasing handwriting is made of a magnetic material that contributes to an interaction with the position detector 200, the interaction by way of the electromagnetic coupling between the electronic eraser function portion 13 of the electronic pen 1 and the position detector 200 is well maintained to allow an erasure instruction signal to be sent from the electronic eraser function portion 13 of the electronic pen 1 to the position detector 200.

The eraser of the position indicator disclosed in Patent Document 2 is made of a resin material, and an interaction by way of an electromagnetic coupling for erasure occurs between the second position indicating coil disposed in the casing of the position indicator and the position detector. Therefore, the distance between the second position indicating oil and the input surface of the position detector is large due to the eraser interposed therebetween, impairing the interaction by way of the electromagnetic coupling for erasure. Another problem is that a large positional error tends to occur between an erasing position indicated on the input surface of the position detector by the position indicator and an erasing position detected and indicated by an interaction by way of an electromagnetic coupling between the second position indicating coil and the position detector.

According to the first embodiment described above, on the other hand, inasmuch as the rubber eraser case 132 is made of a magnetic material as a magnetic path material making up the magnetic path for the coil 134, the rubber eraser case 132 as an example of holder for housing the erasing member 131 can well maintain the interaction by way of the electromagnetic coupling between the electronic eraser function portion 13 and the position detector 200. Moreover, it is possible to reduce a positional error between the visual erasing position indicated on the handwriting information and the erasing position detected by the position detector 200.

In particular, according to the first embodiment described above, the holder that holds the erasing member 131 is made of a magnetic material and the erasing member 131 is also constructed as a member containing a magnetic material, they can well maintain the interaction by way of the electromagnetic coupling between the electronic eraser function portion 13 and the position detector 200. Moreover, it is possible to reduce a positional error between the visual erasing position indicated on the handwriting information and the erasing position detected by the position detector 200.

[Another Configurational Example of the Electronic Eraser Function Portion According to the First Embodiment]

FIG. 7 is a view illustrating another configurational example of the electronic eraser function portion 13 of the electronic pen 1 according to the first embodiment. FIG. 7 illustrates only an electronic eraser function portion 13A that has been extracted which is to be disposed on the other axial end of the tubular casing 11 of the electronic pen 1, as with the first embodiment.

Portion (B) of FIG. 7 is a view of the electronic eraser function portion 13A as viewed from an end face of an erasing member 131A that projects outwardly. Portion (A) of FIG. 7 is a cross-sectional view taken along line A-A of portion (B) of FIG. 7, i.e., a vertical cross-sectional view of the electronic eraser function portion 13A.

The erasing member 131A of the electronic eraser function portion 13A is made of rubber for eliminating a friction ink of the ball-point pen function of the core body 121 of the electronic pen function portion 12, as with the erasing member 131. The erasing member 131A according to this example may also be mixed with a magnetic powder to make itself magnetic.

The electronic eraser function portion 13A according to the present example includes a rubber eraser case 132A that is of a cylindrical structure made of a resin, for example, and having a recess 132Aa defined therein for housing the erasing member 131A therein.

According to this other configurational example, as illustrated in portions (A) and (B) of FIG. 7 a magnetic core with a coil 134A wound thereon, e.g., a ferrite core 135A, is disposed in the rubber eraser case 132A, and a pressure detector 137 is disposed in the rubber eraser case 132A.

As illustrated in portions (A) and (B) of FIG. 7, the ferrite core 135A integrally has a plate-like portion 135Aa embedded in the rubber eraser case 132A in the bottom of the recess 132Aa and extending across the central position of the recess 132Aa, and bent portions 135Ab and 135Ac bent respectively from longitudinal ends of the plate-like portion 135Aa and extending to an end face of the rubber eraser case 132A where the recess 132Aa is open. The coil 134A is wound substantially centrally on the plate-like portion 135Aa of the ferrite core 135A.

According to this example, the pressure detector 137 employs a semiconductor device 137S whose capacitance is variable depending on a pen pressure, as disclosed in Japanese Patent Laid-Open No. 2013-161307. Alternatively, the pressure detector 137 may be constructed as a variable-capacitance capacitor that is of similar structure to the pen pressure detector 124 of the electronic pen function portion 12A. A presser 137P against which the erasing member 131A abuts for transmitting a pressure applied to the erasing member 131A to the pressure detector 137 is disposed in the bottom of the recess 132Aa in the rubber eraser case 132A. The semiconductor device 137S of the pressure detector 137 makes up a variable-capacitance capacitor whose capacitance is variable in response to the pressure applied to the erasing member 131A through the presser 137P.

Although not depicted in FIG. 7, a capacitor that cooperates with the coil 134A in making up a resonant circuit is disposed in the rubber eraser case 132A parallel to the coil 134A. Terminals on both ends of the resonant circuit and terminals on the two electrodes of the variable-capacitance capacitor made up by the semiconductor device 137S of the pressure detector 137 extend from the rubber eraser case 132A for connection to parts on the printed-circuit board in the electronic pen 1.

A tablet terminal that is used with the electronic eraser function portion 13A according to the other configurational example is different from the tablet terminal 2 illustrated in FIG. 4 only as to the structure of a position detector that is different from the position detector 200 thereof, and is structurally identical to the tablet terminal 2 as to other structural details.

As illustrated in portion (A) of FIG. 8, the erasing member 131A contacts the handwriting information input sheet 3 of paper at a position that is different from the positions of the respective distal ends of the two bent portions 135Ab and 135Ac of the ferrite core 135A. The position detector receives erasure instruction signals from the two bent portions 135Ab and 135Ac of the ferrite core 135A. As illustrated in portion (B) of FIG. 8, detection signals from the position detector are obtained respectively at two positions X1 and X2 on both sides of a position Xp of the point where the erasing member 131A contacts the handwriting information input sheet 3 of paper. The detection signals obtained at the respective positions X1 and X2 have intensity levels L1 and L2 depending on the tilt of the electronic pen 1A, i.e., the tilt of the electronic eraser function portion 13A. While portion (B) of FIG. 8 illustrates the detection signals in the X-axis directions of the sensor 212, detection signals in the Y-axis directions are obtained in similar manner.

Based on the detection signals illustrated in portion (B) of FIG. 8, the position detector can calculate the position Xp of the point where the erasing member 131A contacts the handwriting information input sheet 3 of paper as following equation.

$$Xp=(L1*X1+L2*X2)/(L1+L2) \quad \text{(equation 1)}$$

With respect to the Y-axis directions, if the positions where detection signals are obtained are represented by Y1 and Y2 and the position of a point where the erasing member 131A contacts the handwriting information input sheet 3 of paper is represented by Yp, then Yp can be calculated as following equation.

$$Yp=(L1*Y1+L2*Y2)/(L1+L2) \quad \text{(equation 2)}$$

Modifications of the First Embodiment

On the electronic pen 1 according to the first embodiment described above, the electronic pen function portion 12 and the electronic eraser function portion 13 are selected one at a time by the switch 14 that is manually operable. However, the electronic pen function portion 12 and the electronic eraser function portion 13 may be selected one at a time automatically without using the switch 14.

For example, the IC 100 may monitor the pen pressure detected by the pen pressure detector 124 of the electronic pen function portion 12 and the erasing pressure detected by the erasing pressure detector of the electronic eraser function portion 13, and may automatically control the electronic pen function portion 12 or the electronic eraser function portion 13 to operate depending on the pen pressure and the erasing pressure that have been detected. For example, it is assumed that with respect to the pen pressure detected by the pen pressure detector 124 of the electronic pen function portion 12, there is a detection range of 30 to 200 g, for example, for the pen pressure applied to the core body 121. Then, with respect to the erasing pressure detected by the erasing pressure detector of the electronic eraser function portion 13, if the erasing pressure applied to the erasing member 131 exceeds 20 g, then the erasing pressure detector outputs a detected value such that the pressure detected by the position detector 200 is of a value in excess of 200 g. In other words, different pressure detection ranges are established for the pen pressure detected by the pen pressure detector 124 of the electronic pen function portion 12 and the erasing pressure detected by the erasing pressure detector of the electronic eraser function portion 13 and by the position detector 200. Since the IC 100 can thus determine whether the electronic pen function portion 12 or the electronic eraser function portion 13 is operated, the IC 100 can automatically control the electronic pen function portion 12 or the electronic eraser function portion 13 to operate.

The position detector 200 can determine whether it interacts with the electronic pen function portion 12 or the electronic eraser function portion 13 depending on the detected pressure value. If the applied pressure is small, e.g., smaller than 20 g in the above example, then both the electronic pen function portion 12 and the electronic eraser function portion 13 are not operated.

In the above example, the electronic pen function portion 12 or the electronic eraser function portion 13 is determined depending on the pressure value. However, the electronic pen function portion 12 or the electronic eraser function portion 13 may be determined depending on the frequencies of the resonant circuits. For example, the resonant frequencies of the resonant circuit 12R and the resonant circuit 13R illustrated in FIG. 4 may be made different from each other for the position detector 200 to distinguish them from each other. The position detector 200 may thus determine whether it interacts with the electronic pen function portion 12 or the electronic eraser function portion 13 based on the different resonant frequencies upon the interaction by way of the electromagnetic coupling with the electronic pen 1.

Furthermore, the position detector 200 may determine whether it interacts with the electronic pen function portion 12 or the electronic eraser function portion 13 based on different detection areas at indicated positions detected by the respective interactions with the electronic pen function portion 12 and the electronic eraser function portion 13. Specifically, according to the present example, the outside diameter of the rubber eraser case 132 as the holder that holds the erasing member 131 of the electronic eraser function portion 13 may be made larger than the outside diameter of the ferrite core 123 of the electronic pen function portion 12, so that the position detector 200 can determine whether it interacts with the electronic pen function portion 12 or the electronic eraser function portion 13 based on the size of the detection area at the indicated position upon the interaction by way of the electromagnetic coupling with the position detector 200.

On the electronic pen 1 according to the embodiment described above, the electronic pen function portion 12 and the electronic eraser function portion 13 are selected one at a time. However, both function portions may be operated at all times. This is because while one of the electronic pen function portion 12 and the electronic eraser function portion 13 and the position detector 200 are interacting with each other by way of an electromagnetic coupling, the other of the electronic pen function portion 12 and the electronic eraser function portion 13 is positioned remotely from the position detector 200 and weakly electromagnetically coupled to or almost not electromagnetically coupled to the position detector 200, and the position detector 200 has the function to detect a signal from the electronic pen function portion 12 or a signal from the electronic eraser function portion 13.

Specifically, while signals are being sent from both the electronic pen function portion 12 and the electronic eraser function portion 13 of the electronic pen 1, the position detector 200 detects that the signal having the higher level out of the received signals is the signal from either one of the electronic pen function portion 12 and the electronic eraser function portion 13, so that the position detector 200 can well perform processing on the electronic pen function portion 12 and the electronic eraser function portion 13, in similar manner to the above example.

For carrying out the above control process, the electronic pen may have an IC for the electronic pen function portion 12 and an IC for the electronic eraser function portion 13, rather than the common single IC 100.

In order for the position detector 200 to determine a signal from the electronic pen function portion 12 or a signal from the electronic eraser function portion 13, the signal from the electronic pen function portion 12 and the signal from the electronic eraser function portion 13 may be different from each other so that they are distinguishable from each other. The manner in which the signals are different from each other is not limited to the above example.

In the above embodiment, for example, the position detection signal and the erasure instruction signal have different signal transmission patterns though they have the same frequency to allow the position detector to distinguish the signals from each other. According to another method of distinguish the position detection signal and the erasure instruction signal from each other, the position detection signal and the erasure instruction signal may be different frequencies.

Moreover, for example, the IC 100 of the electronic pen 1 may have an ID memory for storing the identification information (referred to as pen ID) of the electronic pen 1, and a signal from the electronic pen function portion 12 may include the pen ID whereas a signal from the electronic eraser function portion 13 may not include the pen ID. In this manner, the position detector 200 may determine whether the received signal is a signal from the electronic pen function portion 12 or a signal from the electronic eraser function portion 13 based on whether or not the received signal includes the pen ID, as described above.

Conversely, a signal from the electronic pen function portion 12 may not include the pen ID whereas a signal from the electronic eraser function portion 13 may include the pen ID. Alternatively, a signal from the electronic pen function portion 12 and a signal from the electronic eraser function portion 13 may include inherent identification signals that are different from each other.

In case amplitude shift keying (ASK) signals or on-off keying (OOK) signals are sent as digital signals representing a pen pressure value detected by the pen pressure detector of the electronic pen function portion 12 and an erasing pressure value detected by the erasing pressure detector of the electronic eraser function portion 13, the digital signal representing the pen pressure value and the digital signal representing the erasing pressure value may be sent from the electronic pen 1 with respective different numbers of bits. In this case, the position detector 200 may determine the signal from the electronic pen function portion 12 or the signal from the electronic eraser function portion 13 based on the different numbers of bits represented by digital signals obtained by modulating the ASK signals or the OOK signals received from the electronic pen 1.

Furthermore, the electronic pen 1 may be arranged such that the electronic pen function portion 12 has the pen pressure detector 124 and the electronic eraser function portion 13 has no erasing pressure detector. When the position detector 200 receives only a burst signal free of erasing pressure information from the electronic pen, the position detector 200 may then determine that the burst signal is an erasure instruction signal.

Moreover, the position detector 200 may register a writing gesture by the core body 121 of the electronic pen function portion 12 and an erasing gesture by the erasing member 131 of the electronic eraser function portion 13. The position detector 200 may then determine whether the interaction by way of the electromagnetic coupling with the position detector 200 is occurring with the electronic pen function portion 12 or the electronic eraser function portion 13 by finding out which one of the gestures is a gesture detected by the position detector 200.

Second Embodiment

The above embodiment is directed to the example of the electronic pen of the electromagnetic coupling type. The present disclosure is also applicable to an electronic pen of the capacitive coupling type.

An electronic pen 1B according to a second embodiment includes an electronic pen function portion having an electrically conductive core body, and a position detection signal and information of a pen pressure value are sent from a signal sending circuit of the electronic pen function portion through the electrically conductive core body to a position detector 200B of the capacitive coupling type via an interaction by way of a capacitive coupling. This configuration will be omitted below as it is well known in the art. According to the second embodiment, the core body of the electronic pen function portion also has the ball-point pen function similar to that of the first embodiment.

Figure 9:
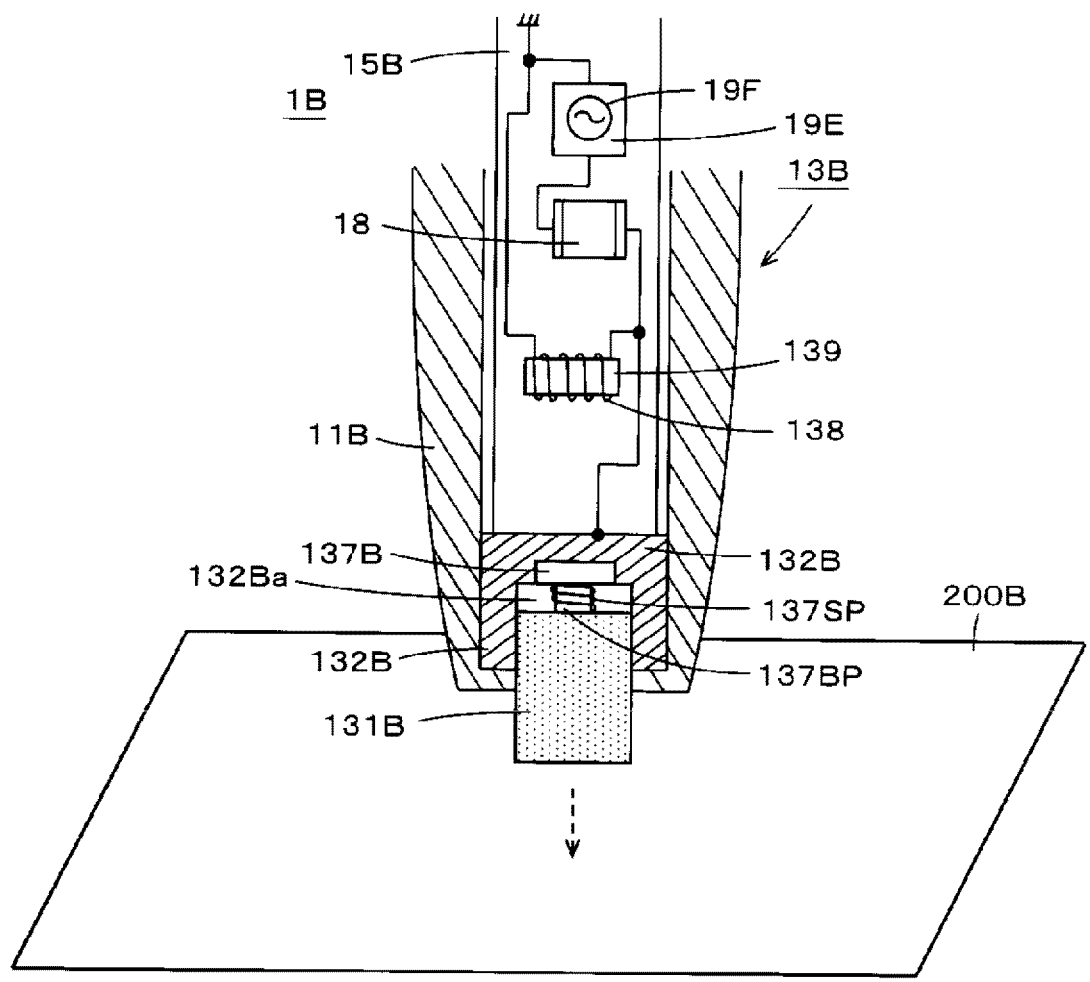
FIG. 9 is a view illustrating a configurational example of a second indicating portion of a position indicator according to a second embodiment of the present disclosure.

FIG. 9 is a view illustrating a configuration of an electronic eraser function portion 13B housed in a casing 11B of the electronic pen 1B of the capacitive coupling type according to the second embodiment. According this example, an erasing member 131B for visually erasing handwriting formed on the handwriting information input sheet 3 of paper is housed in a rubber eraser case 132B that is made of an electrically conductive material as an electric conductor. The erasing member 131B may be a rubber eraser that is made electrically conductive by containing a powder of electrically conductive material.

An erasure instruction signal and information of an erasing pressure value are sent from a signal sending circuit 19E that is made up of a signal oscillating circuit 19F and the electrically conductive rubber eraser case 132B of the electronic eraser function portion 13B, through the electrically conductive rubber eraser case 132B or through the electrically conductive rubber eraser case 132B and the electrically conductive erasing member 131B to the position detector 200B via an interaction by way of a capacitive coupling.

An erasing pressure detector 137B for detecting an erasing pressure is disposed in the bottom of a recess 132Ba defined in the rubber eraser case 132B. According to the present example, the erasing pressure detector 137B is constructed using a semiconductor device whose capacitance is variable depending on a pen pressure, as disclosed in Japanese Patent Laid-Open No. 2013-161307. The semiconductor device of the erasing pressure detector 137B makes up a variable-capacitance capacitor whose capacitance is variable in response to the pressure applied to the erasing member 131B through a presser 137BP. The pressure detector 137B may be constructed as a variable-capacitance capacitor which is of similar structure to the pen pressure detector 124 of the electronic pen function portion 12 according to the first embodiment.

According to the present example, as illustrated in FIG. 9, the presser 137BP is disposed between the erasing pressure detector 137B and the erasing member 131B. A pressure applied to the erasing member 131B is transmitted through the presser 137BP to the erasing pressure detector 137B. In this example, a spring 137SP is disposed between the erasing pressure detector 137B and the erasing member 131B. When the pressure applied to the erasing member 131B is gone, the spring 137SP displaces the erasing member 131B away from the erasing pressure detector 137B.

The erasing pressure detector 137B is connected to an IC 100B (see FIG. 11, not depicted in FIG. 9) disposed on a printed-circuit board 15B and having similar configuration to the IC 100 according to the first embodiment. The IC 100B controls the signal sending circuit 19E for the electronic eraser function portion, which includes the signal oscillating circuit 19F that oscillates at a predetermined frequency, to output therethrough the information of an erasing pressure value detected by the erasing pressure detector 137B. The IC 100B also controls a signal sending circuit 19S (see FIG. 11) for the electronic pen function portion to output therethrough the information of a pen pressure value detected by the pen pressure detector of the electronic pen function portion.

On the printed-circuit board 15B of the electronic pen 1B according to the second embodiment are mounted the signal sending circuit 19S (see FIG. 11, not depicted in FIG. 9) for the electronic pen function portion that sends out a position detection signal, etc. and the signal sending circuit 19E (see FIGS. 9 and 11) of the electronic eraser function portion that sends out an erasure instruction signal, etc.

Figure 10:
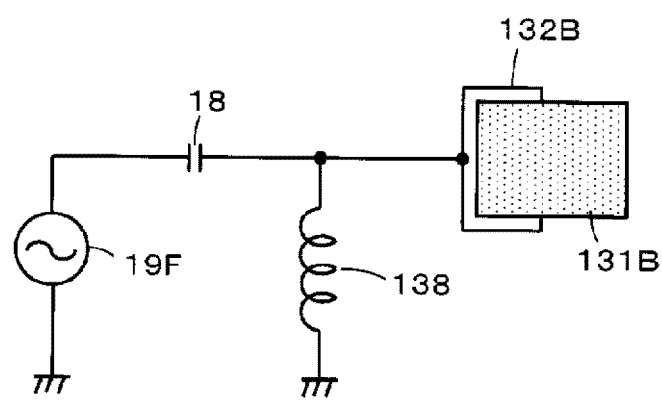
FIG. 10 is a view that is explanatory of a position detecting method for a position detector that receives a signal from the second indicating portion of the position indicator according to the second embodiment of the present disclosure.

According to this example, the signal sending circuit 19E has an output terminal for sending out the erasure instruction signal, which is connected to the electrically conductive rubber eraser case 132B through a capacitor 18 and a coil 138 wound on a magnetic core, e.g., a ferrite core 139, that are arranged to resonate with the oscillating frequency of a signal output from the signal oscillating circuit 19F of the signal sending circuit 19E. Therefore, as illustrated in FIG. 10, the erasure instruction signal is supplied through the capacitor 18 and the coil 138 to the rubber eraser case 132B, and is then sent through the rubber eraser case 132B or the rubber eraser case 132B and the erasing member 131B to the position detector 200B (see FIG. 11) of the capacitive coupling type.

[Configurational Example of the Electronic Circuits of the Electronic Pen 1B and the Position Detector 200B of the Tablet Terminal 2B]

Figure 11:
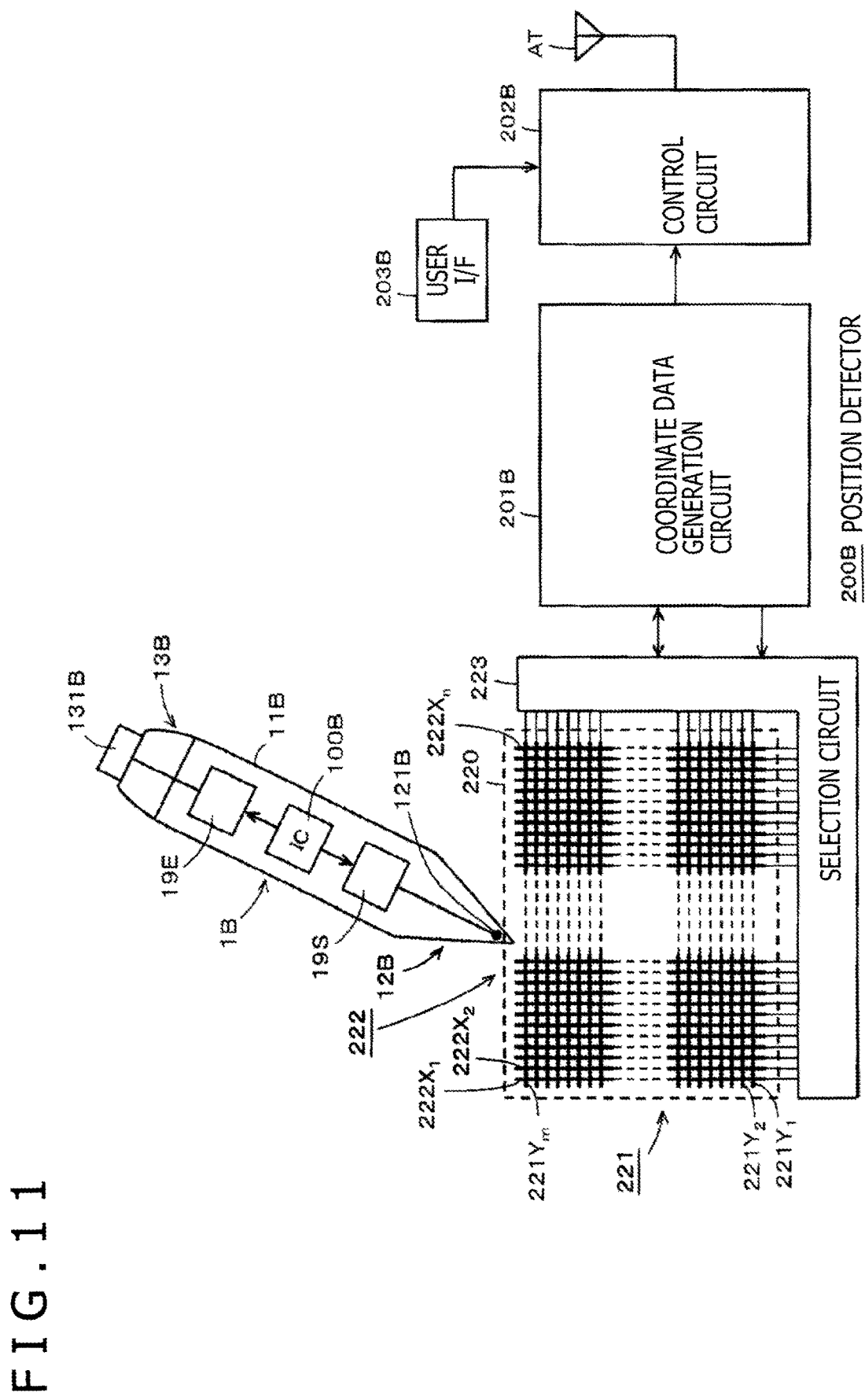
FIG. 11 is a diagram illustrating a configurational example of an electronic circuit of the position indicator according to the second embodiment of the present disclosure and an electronic circuit of the writing information processing apparatus according to the embodiment.

FIG. 11 is a diagram illustrating an configurational example of the circuit of the electronic pen 1B according to the second embodiment and the circuit of the position detector 200B of the tablet terminal 2B for detecting a position and a pen pressure via an interaction by way of a capacitive coupling with an electronic pen function portion 12B of the electronic pen 1B and for detecting an erasing position and a pressure via an interaction by way of a capacitive coupling with the electronic eraser function portion 13B of the electronic pen 1B.

As illustrated in FIG. 11, the position detector 200B according to the second embodiment includes a sensor 220, a coordinate data generation circuit 201B, and a control circuit 202B as a signal processing circuit. According to the present example, the sensor 220 includes a first conductor group 221, an insulating layer (not depicted), and a second conductor group 222 that are successively stacked from the lower layer side. The first conductor group 221 includes, for example, a plurality of first conductors $221Y_1$, $221Y_2$, ..., $221Y_m$ (m is an integer of 1 or greater) extending in horizontal directions (X-axis directions), spaced at predetermined intervals, and disposed parallel to each other across the Y-axis directions.

The second conductor group 222 includes, for example, a plurality of second conductors $222X_1$, $222X_2$, ..., $222X_n$ (n is an integer of 1 or greater) extending in vertical directions (Y-axis directions) transverse, or perpendicular in this example, to the directions in which the first conductors $221Y_1$, $221Y_2$, ..., $221Y_m$ extend, spaced at predetermined intervals, and disposed parallel to each other across the X-axis directions. Each of the first conductor group 221 and the second conductor group 222 is connected to the coordinate data generation circuit 201B through a selection circuit 223.

The sensor 220 of the position detector 200B thus uses a sensor pattern in which the first conductor group 221 and the second conductor group 222 cross each other as described above, in detecting a position indicated by the electronic pen 1B.

The electronic pen function portion 12B of the electronic pen 1B includes, as an interaction circuit, the signal sending circuit 19S, an electrically conductive core body 121B, and a pen pressure detector (not depicted), the electrically conductive core body 121B being a first circuit element. The electronic eraser function portion 13B of the electronic pen 1B includes, as an interaction circuit, the signal sending circuit 19E and the electrically conductive rubber eraser case 132B. The electronic eraser function portion 13B may further include, as an interaction circuit, the erasing member 131B and the erasing pressure detector 137B (see FIG. 9). The electrically conductive rubber eraser case 132B is a second circuit element. If the erasing member 131B is made of an electrically conductive material, then the erasing member 131B is also a second circuit element.

Under the control of the IC 100B, the electronic pen function portion 12B sends a position detection signal and pen pressure information representing a pen pressure value detected by the pen pressure detector from the signal sending circuit 19S that includes an oscillating circuit for outputting a signal having a predetermined oscillating frequency through the core body 121B to the sensor 220. Under the control of the IC 100B, the electronic eraser function portion 13B sends an erasure instruction signal and information of an erasing pressure value detected by the erasing pressure detector 137B through the rubber eraser case 132B and the erasing member 131B, in this example, to the sensor 220. In this example, the pen pressure information and the erasing pressure information are sent as ASK signals or OOK signals.

The selection circuit 223 selects one conductor 221Y or 222X from the first conductor group 221 and the second conductor group 222 based on a selection control signal from the coordinate data generation circuit 201B. The coordinate data generation circuit 201B detects a signal from the conductor selected by the selection circuit 223, and monitors the signal level of the signal to detect the position on the sensor 220, i.e., the position of the conductor, that is indicated by the electronic pen function portion 12B or the electronic eraser function portion 13B.

As with the first embodiment, a position detection signal from the electronic pen function portion 12B and an erasure instruction signal from the electronic eraser function portion 13B of the electronic pen 1B have different intermittent patterns according to methods in which the lengths of continuous signal periods of burst signals included therein are changed or the intermittent periods of the burst signals are changed.

Consequently, the coordinate data generation circuit 201B detects the different intermittent pattern of a signal received through the selection circuit 223 to determine whether the received signal is a position detection signal from the electronic pen function portion 12B or an erasure instruction signal from the electronic eraser function portion 13B of the electronic pen 1B based on the detection result. If a position detection signal from the electronic pen function portion 12B or an erasure instruction signal from the electronic eraser function portion 13B of the electronic pen 1B have different frequencies of the transmit signal, then the coordinate data generation circuit 201B determines whether the received signal is a position detection signal from the electronic pen function portion 12B or an erasure instruction signal from the electronic eraser function portion 13B of the electronic pen 1B by determining the different frequency of the received signal. Furthermore, if one of a position detection signal from the electronic pen function portion 12B or an erasure instruction signal from the electronic eraser function portion 13B includes the identification information (pen ID) of the electronic pen 1B, then the coordinate data generation circuit 201B determines whether the received signal is a position detection signal from the electronic pen function portion 12B or an erasure instruction signal from the electronic eraser function portion 13B based on whether or not the received signal includes the pen ID.

Then, if the signal received through the selection circuit 223 is an ASK signal or an OOK signal, then the coordinate data generation circuit 201B modulates a digital signal from the ASK signal or the OOK signal to detect pen pressure information or pressure information.

In the manner described above, the coordinate data generation circuit 201B detects information of an indicated position and pen pressure information from the electronic pen function portion 12B or information of an indicated position and erasing pressure information from the electronic eraser function portion 13B. Then, the coordinate data generation circuit 201B makes the detected information distinguishable by adding identifying information such as an erasure flag or the like to the information of the indicated position and the erasing pressure information from the electronic eraser function portion 13B, for example, and supplies the detected information to the control circuit 202B. The control circuit 202B outputs the information of the indicated position and the pen pressure information from the electronic pen function portion 12B or the information of the indicated position and the erasing pressure information from the electronic eraser function portion 13B, such that they can be distinguished from each other by the identifying information such as the erasure flag or the like, for example, to the mobile terminal according to an instruction from a user I/F 203B.

On the electronic pen 1B according to the second embodiment, the switching between the electronic pen function portion 12B and the electronic eraser function portion 13B is controlled by the IC 100B in the same manner as the determination of the electronic pen function portion 12 and the electronic eraser function portion 13 according to the first embodiment based on the difference between the pen pressure detection characteristics of the electronic pen function portion 12 and the pen pressure detection characteristics of the electronic eraser function portion 13. Consequently, the details of the switching will be omitted below. The IC 100B may control the switching based on whether the pen pressure detector 124 of the electronic pen function portion 12 has detected a pen pressure or the erasing pressure detector 137B of the electronic eraser function portion 13B has detected a pressure. As described in the modifications of the first embodiment, the electronic pen function portion 12B and the electronic eraser function portion 13B may be operated at all times without being selected one at a time according to the second embodiment. The position detector 200B may be able to determine whether either the electronic pen function portion 12B and the electronic eraser function portion 13B of the electronic pen 1B is operated based on a signal from the electronic pen function portion 12B or a signal from the electronic eraser function portion 13B.

As with the above embodiment described above, the electronic pen 1B according to the second embodiment can erase electronic data corresponding to handwriting on the handwriting information input sheet 3 of paper when the handwriting is visually erased by the erasing member 131B.

Modifications of the Second Embodiment

The second embodiment based on an interaction by way of a capacitive coupling can be modified according to the modifications described with respect to the first embodiment based on an interaction by way of an electromagnetic coupling. In other words, the modifications described with respect to the first embodiment are applicable as they are unless they depend on the differences between the electromagnetic coupling and the capacitive coupling.

In the above embodiment, the erasing member 131B and the rubber eraser case 132B are made of an electric conductor. However, for an interaction by way of a capacitive coupling with the position detector 200B, the rubber eraser case 132B does not need to be made of an electric conductor in entirety of the rubber eraser case 132B, but an electric conductor that can supply a signal output from the signal sending circuit 19E to the erasing member 131B may be disposed in the rubber eraser case 132B or along the rubber eraser case 132B.

The erasing member 131B may not be made of an electric conductor, but only the rubber eraser case 132B may be made of an electric conductor, or an electric conductor that can send a signal output from the signal sending circuit 19E to the position detector 200B may be disposed in the rubber eraser case 132B or along the rubber eraser case 132B for sending an erasure instruction to the position detector 200B via an interaction by way of a capacitive coupling.

Moreover, the erasing member 131B may not be made of an electric conductor in its entirety, but an electric conductor capable of interacting with the position detector 200B by way of a capacitive coupling may be embedded in the erasing member 131B.

Third Embodiment

In the above embodiments, the electronic pen function portion and the electronic eraser function portion of the electronic pen interact with the sensor of the position detector of the tablet terminal by way of one kind of electromagnetic coupling or capacitive coupling. However, some tablet terminals have both a sensor for an electromagnetic coupling and a sensor for a capacitive coupling. A third embodiment refers to an example in which using such a tablet feature, an electronic pen function portion and an electronic eraser function portion of an electronic pen operate on different principles for an interaction with a sensor of a position detector of a tablet terminal.

Figure 12:
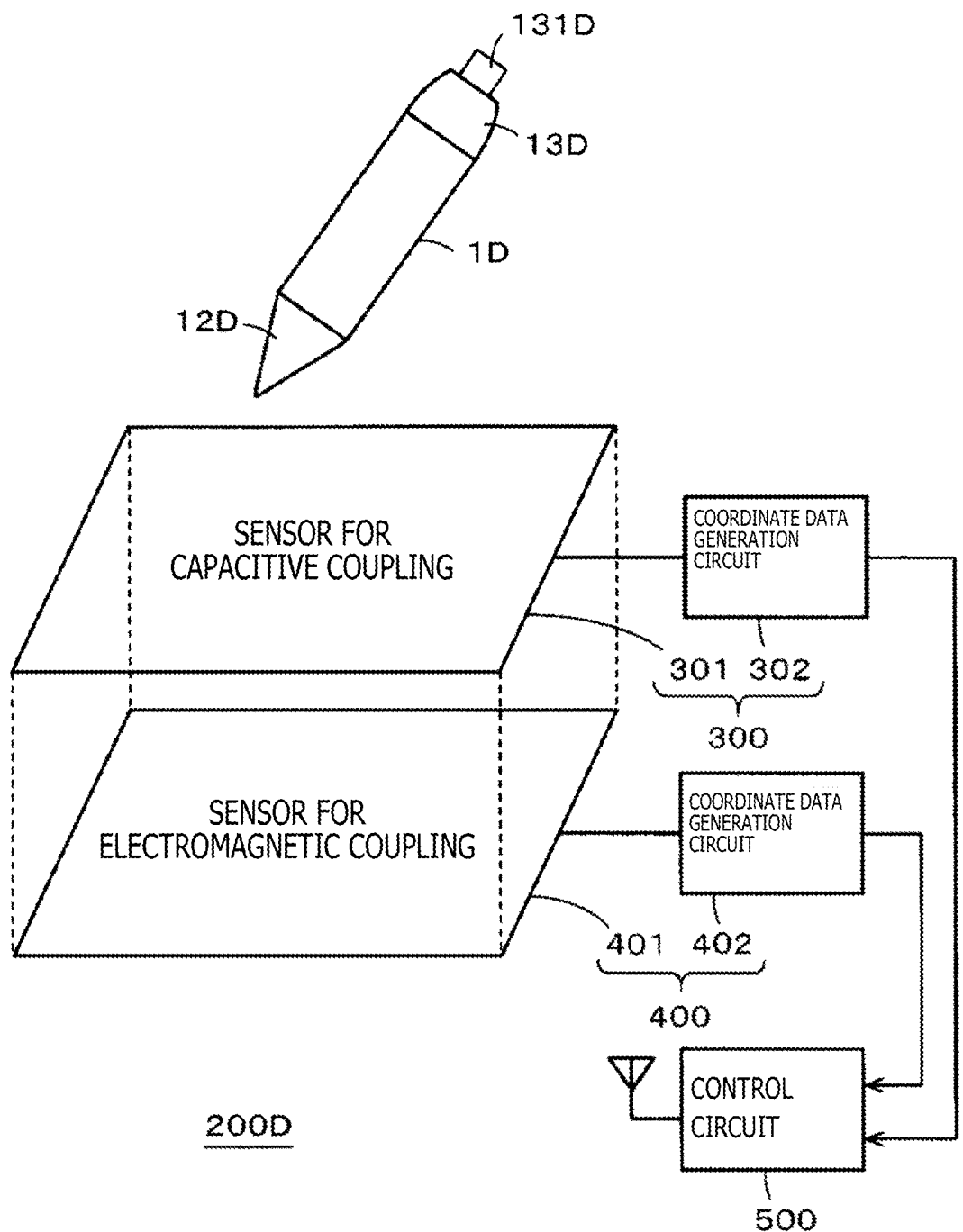
FIG. 12 is a view that is explanatory of a position indicator and a writing information processing apparatus according to a third embodiment of the present disclosure.

FIG. 12 is a view that is explanatory of a configurational example of an electronic pen 1D and a position detector 200D of a tablet terminal according to the third embodiment. As illustrated in FIG. 12, the position detector 200D of the tablet terminal according to the third embodiment includes both a position detector 300 of the capacitive coupling type and a position detector 400 of the electromagnetic coupling type. The position detector 300 of the capacitive coupling type includes a sensor 301 of the capacitive coupling type similar to the configuration illustrated in FIG. 11, for example, and a coordinate data generation circuit 302. The position detector 400 of the electromagnetic coupling type includes a sensor 401 of the electromagnetic coupling type similar to the configuration illustrated in FIG. 4, for example, and a coordinate data generation circuit 402. The sensor 301 of the position detector 300 of the capacitive coupling type and the sensor 401 of the position detector of the electromagnetic coupling type are stacked one over the other, as illustrated in FIG. 12. A rest surface (position detection area) is shared by the sensor 301 of the position detector 300 of the capacitive coupling type and the sensor 401 of the position detector 400 of the electromagnetic coupling type. Information detected by the coordinate data generation circuit 302 of the position detector 300 of the capacitive coupling type and information detected by the coordinate data generation circuit 402 of the position detector 400 of the electromagnetic coupling type are sent, with a common paper ID added thereto, to a control circuit 500.

The electronic pen 1D according to the third embodiment includes an electronic pen function portion 12D of the electromagnetic coupling type constructed as illustrated in FIG. 2, for example, and an electronic eraser function portion 13D of the capacitive coupling type constructed as illustrated in FIG. 9, for example, and having an erasing member 131D similar to the erasing member 131B.

The control circuit 500 handles a signal from the coordinate data generation circuit 402 as a signal from the electronic pen function portion 12D of the electronic pen 1D for performing a writing process, and handles a signal from the coordinate data generation circuit 302 as a signal from the electronic eraser function portion 13D, by adding identification information such as an erasure flag, for example, for performing an erasing process. The control circuit 500 then sends the signal from the electronic pen function portion 12D and the signal from the electronic eraser function portion 13D, while making them distinguishable from each other by an erasure flag, for example, and associating them with a common paper ID, to the mobile terminal.

The electronic pen 1D according to the third embodiment may control the electronic pen function portion 12D and the electronic eraser function portion 13D to operate selectively or to operate together at all times.

In the third embodiment described above, the electronic pen function portion 12D is of the electromagnetic coupling type whereas the electronic eraser function portion 13D is of the capacitive coupling type. Conversely, the electronic pen function portion 12D may be of the capacitive coupling type whereas the electronic eraser function portion 13D may be of electromagnetic coupling type. According to such an alternative, the control circuit 500 handles a signal from the coordinate data generation circuit 402 as a signal from the electronic eraser function portion 13D of the electronic pen 1D, by adding identification information such as an erasure flag, for example, for performing an erasing process, and handles a signal from the coordinate data generation circuit 302 as a signal from the electronic pen function portion 12D for performing a writing process.

Other Embodiments or Modifications

In the above embodiments, the rubber eraser case is separate from the casing 11 of the position indicator 1 and fitted in the rear end portion of the casing 11 that is opposite to the electronic pen function portion. However, the rubber eraser case may be integrally formed with the rear end portion of the casing 11 and the recess in the rear end portion of the casing 11 may be used to hold the erasing member inserted therein. According to such an alternative, the rear end portion of the casing 11 with the recess defined therein is rendered magnetic by a magnetic powder mixed therein according to the first embodiment, and rendered electrically conductive by a powder of conductor mixed therein according to the second embodiment. Furthermore, the rubber eraser case as a holder may be housed in the casing 11 of the position indicator 1 or may be housed therein so as to be at least partly exposed from the casing 11 in an axial direction of the position indicator 1.

In the first embodiment, the rubber eraser case 132 is made of a magnetic material. However, a ferrite core may be disposed in the bottom of a recess defined in a rubber eraser case of resin and may integrally have a plate-like portion embedded in the bottom of the recess and extending across the central position of the recess, and bent portions bent respectively from longitudinal ends of the plate-like portion and extending to an end face of the rubber eraser case where the recess is open. A coil may be wound on the ferrite core.

The magnetic core with the coil wound thereon may not be housed in the rubber eraser case, but may be embedded in the erasing member. According to such an alternative, a capacitor as a capacitive element that cooperates with the coil in making up a resonant circuit may also be embedded in the erasing member while being connected to the coil to cooperate with the coil in making up the resonant circuit.

The rubber eraser case with the recess defined therein is used as the holder for the erasing member. However, rather than the rubber eraser case, the recess defined in the casing of the electronic pen remotely from the electronic pen function portion may be used as a holder for the erasing member.

In the above embodiments, the electronic pen includes the electronic eraser function portion. However, the electronic eraser function portion may be constructed separately from the electronic pen.

The above embodiments are concerned with the electronic pen having the ball-point pen function that uses the erasable friction ink as the core body for visually forming handwriting corresponding to a writing operation, and the erasing member is made of rubber for erasing the friction ink of the ball-point pen function. However, the writing instrument function of the core body for visually forming handwriting corresponding to a writing operation is not limited to an erasable ball-point pen (hereinafter referred to as erasable pen) described above, but may be provided by an ordinary ball-point pen that is difficult to erase, a mechanical pencil, a fountain pen, or the like, and may also be considered to be provided by an electronic pen having such a writing instrument function.

The rubber eraser may not be a rubber eraser for erasing the friction ink of the ball-point pen function described above, but may be an ordinary rubber eraser (referred to as normal rubber eraser) for general mechanical pencils and pencils and a sand eraser capable of erasing writing by fountain pens and ordinary ball-point pens.

Handwriting may be made erasable or left unerasable, and it is convenient for the electronic pen to have selectivity with respect to the erasure of handwriting. One example would be a case in which frame lines should be left unerased and handwriting such as of letters in areas surrounded by frame lines should be erased. Moreover, when an ordinary ballpoint pen with a hard pen point is used to write something on a sheet of paper, it may leave the sheet of paper deformed (marked) caused by the recess by pressing the sheet of paper. Electronic data representing the handwriting mark on the sheet of paper may be left unerased, and when the electronic data are to be displayed, it may be desirable to control the display thereof.

It would be very troublesome for the user to manage the need to leave the electronic data of the handwriting and control the display thereof with respect to the erasure selectivity and the mark left after the erasure. An example to be described below is directed to making the management easy.

An electronic pen according to the example to be described below includes an electronic pen function portion 12 constructed as a replaceable cartridge (see Japanese Patent Laid-Open No. 2016-184444). Alternatively, as with a knock-type multi-color ball-point pen, a plurality of cartridges are housed in the casing of an electronic pen, and in response to a knocking action, either one of the cartridges can be selected to have its pen point exposed out of an opening defined in an axial end of the casing (see Japanese Patent Laid-Open No. 2016-184444).

Each of the cartridges has an electronic pen function of the electromagnetic induction type. In this example, each of the cartridges also has a writing instrument function of either one of four kinds including a mechanical pencil, a ball-point pen using an erasable friction ink (erasable ball-point pen), a fountain pen, and an ordinary ball-point pen not using a friction ink.

The electronic pen according to the example to be described below includes, as an erasing member of an electronic eraser function portion, two types including an ordinary rubber eraser made of rubber for use with mechanical pencils and erasable pens and a sand rubber eraser, replaceably housed in a rubber eraser case as a holder.

According to the present example, a signal to be sent from an electronic pen function portion of the electronic pen to a tablet terminal includes, in addition to a position detection signal and pen pressure information, identification information (cartridge ID) for identifying which one of the four types of writing instrument functions that the cartridge has. According to the present example, a signal to be sent from the electronic eraser function portion of the electronic pen to the tablet terminal includes, in addition to an erasure signal and erasing pressure information, identification information (erasing member ID) for identifying which one of the two types that the erasing member belongs to.

An information processing apparatus that is connected to a tablet terminal through a wired or wireless link, e.g., a server apparatus connected to a network through the mobile terminal or a personal computer or through the tablet terminal, the mobile terminal, or the personal computer, stores therein an attribute information table of attribute information regarding the four types of writing instrument functions that the cartridges of the electronic pen function portion have, in association with respective identification information (cartridge IDs).

FIG. 13 illustrates by way of example such an attribute information table about the four types of writing instrument functions. In this example, the attribute information regarding the writing instrument functions is represented by a handwriting flag and a recording ability. The handwriting flag, denoted by PF, represents information that indicates:

PF=0: when handwriting is erased by the erasing member, all writing data are erased;

PF=1: when handwriting is erased by the erasing member, writing data are left unerased, but inhibited from being displayed.

Whether writing data are to be inhibited from being displayed or permitted to be displayed is indicated by a display flag to be described below.

The recording ability, denoted by RC, represents level information corresponding to an erasing ability by the erasing member to be described below. There are prescribed two levels, RC=1 and RC=2, for the recording ability RC.

According to the present example, as illustrated in FIG. 13, identification information (cartridge ID) "ID1," a writing flag "0," and a recording ability "1" are assigned to the writing instrument function of a mechanical pencil. Identification information (cartridge ID) "ID2," a writing flag "1," and a recording ability "1" are assigned to the writing instrument function of an erasable pen. Identification information (cartridge ID) "ID3," a writing flag "0," and a recording ability "2" are assigned to the writing instrument function of a fountain pen. Identification information (cartridge ID) "ID4," a writing flag "1," and a recording ability "2" are assigned to the writing instrument function of an ordinary ball-point pen.

The information processing apparatus that is connected to the tablet terminal through the wired or wireless link stores therein an attribute information table of attribute information regarding the two types of erasing members of the electronic eraser function portion in association with the respective identification information (erasing member IDs).

FIG. 14 illustrates by way of example such an attribute information table about the two types of erasing members. In this example, the attribute information regarding the erasing members is represented by an erasing ability. The erasing ability, denoted by ER, represents level information corresponding to a recording ability. There are prescribed two levels, ER=1 and ER=2, for the erasing ability ER. According to the present example, the recording ability RC and the erasing ability ER are compared with each other, and if the erasing ability ER is equal to or larger than the recording ability RC (ER≥RC), it can be decided that handwriting can be erased (can be visually erased) by the erasing member, and if the erasing ability ER is smaller in level than the recording ability RC (ER<RC), then it can be decided that handwriting cannot be erased (cannot be visually erased).

In this example, as illustrated in FIG. 14, identification information (erasing member ID) "IDa" and an erasing ability "0" are assigned to an erasing member as a common rubber eraser, and stored. Identification information (erasing member ID) "IDb" and an erasing ability "1" are assigned to an erasing member as a sand rubber eraser, and stored.

The information processing apparatus that is connected to the tablet terminal through the wired or wireless link manages writing data in a storage data format illustrated in FIG. 15. As illustrated in FIG. 15, the storage data format for writing data includes a paper ID, a handwriting flag, a recording ability, a display flag, and coordinate data. The coordinate data include pen pressure information, with time information added that represents the time at which writing is made.

When the information processing apparatus that is connected to the tablet terminal through the wired or wireless link receives information of an indicated position based on a signal from the electronic pen function portion, pen pressure information, a cartridge ID, and a paper ID from the tablet terminal, the information processing apparatus stores, as illustrated in FIG. 15, the received paper ID at a leading end, then stores the corresponding handwriting flag PF and recording ability RC by referring to the attribute information table about the writing instrument functions illustrated in FIG. 13 based on the received cartridge ID, then stores the display flag "1," and finally stores coordinate data including pen pressure information with time information added.

Then, when the information processing apparatus receives information of an indicated position based on a signal from the electronic eraser function portion, erasing pressure information, an erasing member ID, and a paper ID from the tablet terminal, the information processing apparatus detects writing data to be erased from the paper ID and the coordinate data, recognizes the erasing ability by referring to the attribute information table about the erasing members illustrated in FIG. 14 based on the erasing member ID, compares the recognized erasing ability and the recording ability stored in the storage data format of the detected writing data, and performs a control process to determine whether all the detected writing data are to be erased, the display flag of the storage data format is to change from "1" to "0," and the data are not to be erased.

Figure 16:
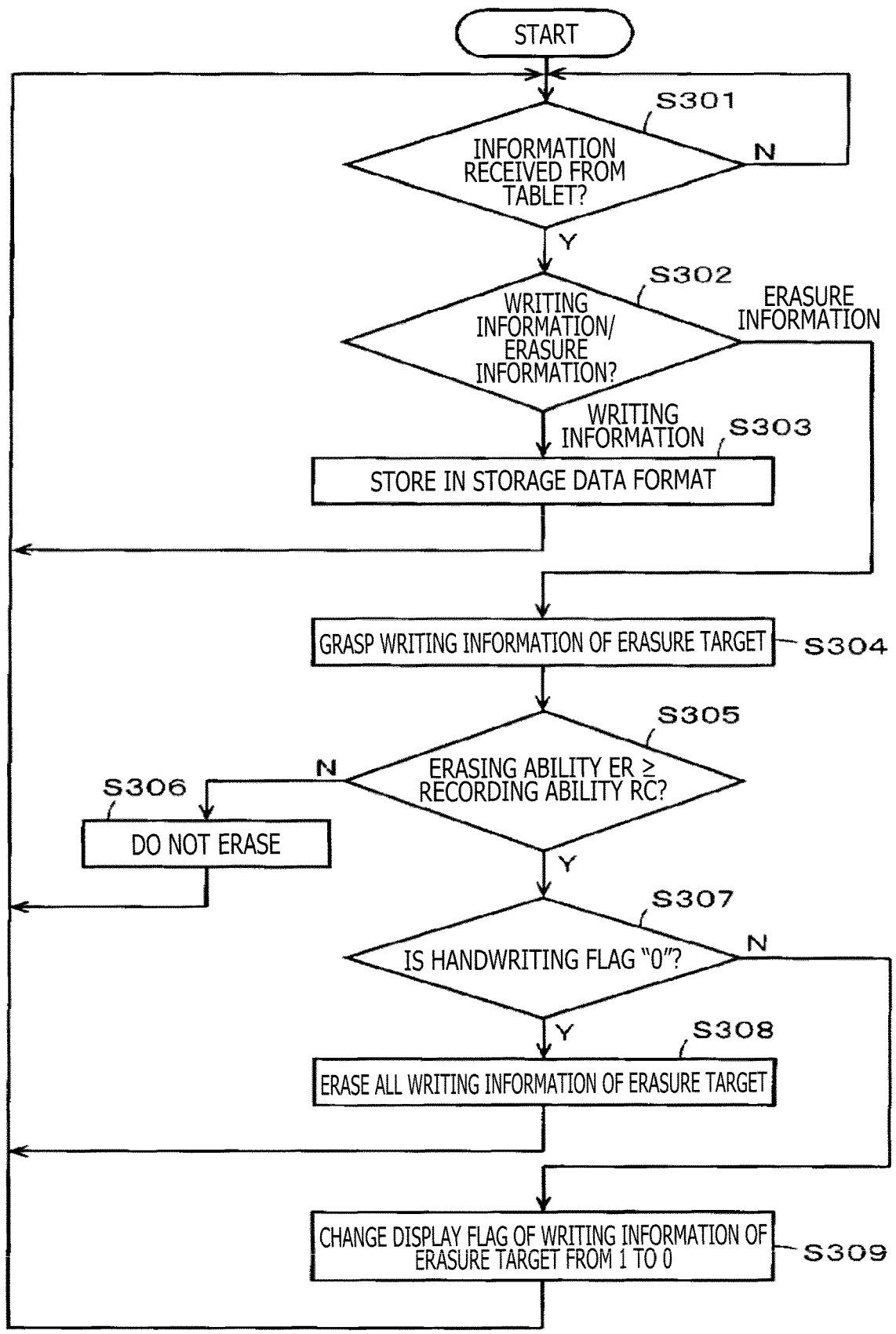
FIG. 16 is a diagram illustrating a flowchart that is explanatory of an example of operation of the position indicator according to the other embodiment of the present disclosure.

FIG. 16 illustrates a flowchart of an example of processing operation of the information processing apparatus that is connected to the tablet terminal. The information processing apparatus waits for information from the tablet (S301). If the information processing apparatus determines that it has received information from the tablet at S301, then the information processing apparatus determines whether the received information is writing information via an interaction between the electronic pen function portion and the tablet terminal or erasure information via an interaction between the electronic eraser function portion and the tablet terminal (S302).

If the information processing apparatus determines that the received information is writing information at S302, then the information processing apparatus refers to the attribute information table about the writing instrument functions based on the cartridge ID included in the received writing information to specify the handwriting flag and recording ability, and stores writing data in the storage data format illustrated in FIG. 14 (S303). At this time, the information processing apparatus stores the display flag "1." After S303, the information processing apparatus makes processing return to S301, and repeats the process from S301.

If the information processing apparatus determines that the received information is erasure information at S302, then the information processing apparatus grasps writing information to be erased from the paper ID and coordinate data included in the received erasure information (S304). Then, the information processing apparatus refers to the attribute information table about the erasing members based on the erasing member ID included in the received erasure information to detect the erasing ability thereof, compares the detected erasing ability with the recording ability included in the writing information to be erased, and determines whether or not the erasing ability ER is of a level equal to or larger than the recording ability RC (S305).

If the information processing apparatus determines that the erasing ability ER is not of a level equal to or larger than the recording ability RC at S305, then the information processing apparatus decides that the writing information to be erased will not be erased (S306), makes processing return to S301, and repeats the process from S301. If the information processing apparatus determines that the erasing ability ER is of a level equal to or larger than the recording ability RC at S305, then the information processing apparatus determines whether or not the handwriting flag for the writing information to be erased is "0" (S307).

If the information processing apparatus determines that the handwriting flag is "0" at S307, then the information processing apparatus erases the entire writing information to be erased (S308). After S308, the information processing apparatus makes processing return to S301, and repeats the process from S301.

If the information processing apparatus determines that the handwriting flag is not "0" but "1" at S307, then the information processing apparatus does not erase the writing information to be erased and changes the display flag in the storage data format from "1" to "0" (S309). After S309, the information processing apparatus makes processing return to S301, and repeats the process from S301.

In the manner described above, the information processing apparatus manages the writing information with respect to its erasure in a fashion commensurate with an erasing process on the sheet of paper by the erasing member. For example, if an ordinary ball-point pen whose recording ability is of a high level writes a frame line, then a mechanical pen or erasable pen whose recording ability is of a low level writes letters or the like in an area surrounded by the frame line, and an erasing member whose erasing ability carries out an erasure, then the letters or the like in the area surrounded by the frame line are erased. In a corresponding manner, writing data of only the letters or the like are now erased, leaving the frame line unerased. In other words, selectivity is given about erasing handwriting.

According to the above example, when an ordinary ball-point pen writes something on the sheet of paper, as the handwriting flag for the ordinary ball-point pen is "1," even if handwriting by the ball-point pen is erased using an erasing member as a sand rubber eraser that is capable of erasing the handwriting, writing data according to the mark left on the sheet of paper are left unerased, but not displayed, a process which is convenient. According to this example, since the handwriting flag for the erasable pen is similarly "1," writing data thereof are left unerased.

In the example illustrated with reference to FIGS. 13 through 16, the electronic pen incorporates the electronic eraser function portion therein. However, the electronic eraser function portion may be constructed separately from the electronic pen.

The electronic pen according to the example illustrated with reference to FIGS. 13 through 16 is of the electromagnetic induction type. However, the electronic pen may be of the capacitance type.

DESCRIPTION OF REFERENCE SYMBOLS

1, 1A, 1B, 1D . . . Electronic pen, 2, 2A, 2B . . . Tablet terminal, 12, 12A, 12B, 12D . . . Electronic pen function portion, 13, 13A, 13B, 13D . . . Electronic eraser function portion, 131, 131A, 131B . . . Erasing member, 132, 132A, 132B . . . Rubber eraser case, 200, 200B, 200D . . . Position detector

The invention claimed is:
1. A position indicator that indicates a plurality of positions on a sensor surface of a sensor by a plurality of interactions with the sensor, the position indicator comprising:

a pen-shaped casing that includes, in respective axial ends thereof, a first indicating portion and a second indicating portion; and an interaction circuit which, in operation, causes the plurality of interactions between the sensor and the position indicator, wherein:

the first indicating portion includes:
a core body that projects axially from the casing, the core body, in operation, visibly forming handwriting in response to a writing operation of the position indicator, and
a first circuit element of the interaction circuit which, in operation, enables a first position indicated on the sensor surface by the first indicating portion to be detected via a first interaction between the interaction circuit and the sensor;

the second indicating portion includes:
an erasing member that projects axially from the casing, the erasing member, in operation, erasing the handwriting that is visibly formed by the core body included the first indicating portion, and
a second circuit element of the interaction circuit which, in operation, enables a second position indicated on the sensor surface by the second indicating portion to be detected via a second interaction between the interaction circuit and the sensor;

the erasing member is held by a holder that is at least partially disposed inside the casing; and the holder includes a member which, in operation, cooperates with the second circuit element to cause the second interaction between the second circuit element and the sensor, wherein:

the second interaction between the second indicating portion and the sensor is caused by an electromagnetic coupling based on the interaction circuit;

the interaction circuit includes a resonant circuit made up of a capacitive element, and an inductive element wound on a magnetic material;

the second circuit element included in the second indicating portion includes the magnetic material of the resonant circuit; and the holder that holds the erasing member causes the second interaction with the sensor.

2. The position indicator according to claim 1, wherein:
the erasing member includes a magnetic material.

3. The position indicator according to claim 1, wherein:
the holder is integrally formed with the second circuit element.

4. The position indicator according to claim 1, wherein:
the first interaction between the first indicating portion and the sensor is caused by an electromagnetic coupling based on a resonant circuit included in the interaction circuit;
the resonant circuit includes a capacitive element, and an inductive element wound on a magnetic material; and
the first circuit element included in the first indicating portion includes the magnetic material of the resonant circuit.

5. The position indicator according to claim 1, wherein:
the interaction circuit, in operation, enables the sensor and the first indicating portion and the second indicating portion to cause the interactions;
an area of the holder facing the sensor surface of the sensor is larger than an area of the first circuit element; and the area of the first circuit element faces the sensor surface.

6. The position indicator according to claim 1, wherein:
information indicating a recording ability of the first indicating portion with respect to an erasing ability of the erasing member of the second indicating portion is transmitted to the sensor via an interaction of the first circuit element of the first indicating portion with the sensor; and
information indicating the erasing ability of the erasing member of the second indicating portion is transmitted to the sensor via an interaction of the second circuit element of the second indicating portion with the sensor.

7. The position indicator according to claim 6, wherein:
the information indicting the recording ability of the first indicating portion with respect to the erasing ability of the erasing member of the second indicating portion is transmitted to the sensor via the first interaction of the first circuit element of the first indicating portion with the sensor, and flag information that indicates whether an erasure of data of the handwriting that is visibly formed on the sensor surface by the first indicating portion is permitted is transmitted to the sensor.

8. A writing information processing apparatus comprising:
a sensor;
a signal processing circuit connected to the sensor; and
a position indicator including a pen-shaped casing, wherein:
the position indicator, in operation, indicates a plurality of positions on a sensor surface of the sensor;
the positions indicated by the position indicator are detected by a plurality of interactions between the position indicator and the sensor;
the casing of the position indicator includes, in respective axial ends thereof, a first indicating portion, a second indicating portion, and an interaction circuit which, in operation, causes the plurality of interactions between the sensor and the position indicator;
the first indicating portion includes:
a core body that projects axially from the casing, the core body, in operation, visibly forming handwriting in response to a first writing operation of the position indicator, and
a first circuit element of the interaction circuit which, in operation, enables a first position indicated on the sensor surface by the first indicating portion to be detected via a first interaction between the interaction circuit and the sensor;
the second indicating portion includes:
an erasing member that projects axially from the casing, the erasing member, in operation, visually erasing the handwriting that is visibly formed by the core body included the first indicating portion, and
a second circuit element of the interaction circuit which, in operation, enables a second position indicated on the sensor surface by the second indicating portion to be detected via a second interaction between the interaction circuit and the sensor;
the erasing member is held by a holder;
the holder includes a member which, in operation, cooperates with the second circuit to cause the second interaction between the second circuit element and the sensor;

the sensor surface includes a positioning portion that positions a recording medium on which the handwriting by the core body is visibly recorded;

the signal processing circuit detects a first position indicating operation on the sensor surface by the first indicating portion or a second position indicating operation on the sensor surface by the second indicating portion based on the first or second interaction between the position indicator and the sensor;

the writing information processing apparatus, in operation, performs a first writing information recording process that records first positional information corresponding to the first writing operation on the recording medium by the first indicating portion in response to a detection of the first position indicating operation on the sensor surface by the first indicating portion; and the writing information processing apparatus, in operation, performs a second writing information recording process that records second positional information corresponding to an operation of the second indicating portion in a manner distinguishable from writing information recorded by the first writing information recording process, in response to a detection of the second position indicating operation on the sensor surface by the second indicating portion, wherein the first positional information and the second positional information are distinguishable by identification information that is added to the second positional information.

9. The writing information processing apparatus according to claim 8, wherein:

the sensor and the first indicating portion and the second indicating portion, in operation, cause the interactions;

an area of the holder facing the sensor surface of the sensor is larger than an area of the first circuit element; and the area of the first circuit element faces the sensor surface.

10. A position indicator that indicates a plurality of positions on a sensor surface of a sensor, the position indicator comprising:

a pen-shaped casing that includes, in a first axial end thereof, an indicating portion; and an interaction circuit which, in operation, causes a plurality of interactions between the sensor and the indicating portion, wherein:

the indicating portion includes:

an erasing member that projects axially from the casing, the erasing member, in operation, visually erasing handwriting that is visibly formed, and a circuit element of the interaction circuit which, in operation, enables a position indicated on the sensor surface by the indicating portion to be detected via an interaction between the interaction circuit and the sensor;

the erasing member is held by a holder that is at least partially disposed inside the casing; and the holder includes a member which, in operation, cooperates with the circuit element to cause an interaction between the indicating portion and the sensor, wherein:

the interaction between the indicating portion and the sensor is caused by an electromagnetic coupling based on the interaction circuit;

the interaction circuit includes a resonant circuit made up of a capacitive element, and an inductive element wound on a magnetic material;

the circuit element included in the indicating portion includes the magnetic material of the resonant circuit; and the holder that holds the erasing member causes the interaction with the sensor.

11. The position indicator according to claim 10, wherein the holder is integrally formed with the circuit element.

12. A position indicator that indicates a plurality of positions on a sensor surface of a sensor, the position indicator comprising:

a pen-shaped casing that includes, in a first axial end thereof, an indicating portion; and an interaction circuit which, in operation, causes a plurality of interactions between the sensor and the indicating portion, wherein:

the indicating portion includes:

an erasing member that projects axially from the casing, the erasing member, in operation, visually erasing handwriting that was visibly formed, and a circuit element of the interaction circuit which, in operation, enables a position indicated on the sensor surface by the indicating portion to be detected via an interaction between the interaction circuit and the sensor;

the erasing member is held by a holder that is at least partially disposed inside the casing; and the holder includes a member which, in operation, cooperates with the circuit element to cause an interaction between the indicating portion and the sensor, wherein:

the interaction between the indicating portion and the sensor surface of the sensor is caused by a capacitive coupling based on the interaction circuit;

the interaction circuit includes a signal oscillating circuit, which in operation, sends a signal to the circuit element including an electric conductor that is included in the indicating portion; and the holder that holds the erasing member is made up of an electrically conductive member and is part of the circuit element; and interaction of the erasing member with the sensor causes an erasing operation.

13. The position indicator according to claim 12, wherein the holder is integrally formed with the circuit element.

* * * * *